United States Patent
Seike et al.

(10) Patent No.: US 12,358,791 B2
(45) Date of Patent: Jul. 15, 2025

(54) HYDROGEN PRODUCTION APPARATUS AND HYDROGEN PRODUCTION METHOD

(71) Applicant: ENEOS CORPORATION, Tokyo (JP)

(72) Inventors: Tadashi Seike, Tokyo (JP); Shuuichi Suzuki, Tokyo (JP)

(73) Assignee: ENEOS CORPORATION, Tokyo (JP)

( * ) Notice: Subject to any disclaimer, the term of this patent is extended or adjusted under 35 U.S.C. 154(b) by 959 days.

(21) Appl. No.: 17/600,450

(22) PCT Filed: Apr. 1, 2020

(86) PCT No.: PCT/JP2020/015000
§ 371 (c)(1),
(2) Date: Sep. 30, 2021

(87) PCT Pub. No.: WO2020/204064
PCT Pub. Date: Oct. 8, 2020

(65) Prior Publication Data
US 2022/0162066 A1    May 26, 2022

(30) Foreign Application Priority Data
Apr. 3, 2019  (JP) .................................. 2019-071495

(51) Int. Cl.
| | |
|---|---|
| B01J 19/00 | (2006.01) |
| B01J 19/24 | (2006.01) |
| C01B 3/38 | (2006.01) |
| H01M 8/0432 | (2016.01) |
| H01M 8/0438 | (2016.01) |
| H01M 8/0606 | (2016.01) |

(52) U.S. Cl.
CPC ............. *C01B 3/38* (2013.01); *B01J 19/0013* (2013.01); *B01J 19/2415* (2013.01);
(Continued)

(58) Field of Classification Search
CPC .... B01J 19/00; B01J 19/0006; B01J 19/0013; B01J 19/24; B01J 19/2415; B01J 2219/00;
(Continued)

(56) References Cited

U.S. PATENT DOCUMENTS

2011/0009627 A1* 1/2011 Schmidtke ............... B01J 8/008
422/240
2011/0159389 A1  6/2011 Ohara et al.
(Continued)

FOREIGN PATENT DOCUMENTS

| CN | 101743191 | 6/2010 |
| CN | 102149983 | 8/2011 |

(Continued)

OTHER PUBLICATIONS

International Search Report issued in International Patent Application No. PCT/JP2020/015000, dated Jun. 30, 2020, along with an English translation thereof.

(Continued)

*Primary Examiner* — Natasha E Young
(74) *Attorney, Agent, or Firm* — Greenblum & Bernstein, P.L.C.

(57) ABSTRACT

According to one aspect of the present invention, a hydrogen production apparatus includes a hydrogen production mechanism configured to produce a hydrogen gas from a raw material by using a catalyst; and an operation control circuit configured to input a parameter value as an index indicating a state of the catalyst, and configured to control an operation maximum load of the hydrogen production mechanism to be variable in correspondence with the parameter value.

17 Claims, 12 Drawing Sheets

(52) U.S. Cl.
CPC ....... *H01M 8/0432* (2013.01); *H01M 8/0438* (2013.01); *H01M 8/0606* (2013.01); *B01J 2219/00063* (2013.01); *B01J 2219/00162* (2013.01); *B01J 2219/00198* (2013.01); *B01J 2219/002* (2013.01); *B01J 2219/00202* (2013.01); *C01B 2203/0227* (2013.01); *C01B 2203/1619* (2013.01); *C01B 2203/1633* (2013.01)

(58) Field of Classification Search
CPC .... B01J 2219/00049; B01J 2219/00051; B01J 2219/00054; B01J 2219/00056; B01J 2219/00058; B01J 2219/00063; B01J 2219/00162; B01J 2219/00191; B01J 2219/00193; B01J 2219/00195; B01J 2219/00198; B01J 2219/002; B01J 2219/00202; C01B 3/00; C01B 3/02; C01B 3/32; C01B 3/34; C01B 3/38; C01B 3/384; C01B 3/48; C01B 2203/00; C01B 2203/02; C01B 2203/0205; C01B 2203/0227; C01B 2203/0233; C01B 2203/04; C01B 2203/042; C01B 2203/043; C01B 2203/10; C01B 2203/1041; C01B 2203/1047; C01B 2203/1052; C01B 2203/1058; C01B 2203/16; C01B 2203/1614; C01B 2203/1619; C01B 2203/1628; C01B 2203/1633; H01M 8/00; H01M 8/04; H01M 8/04298; H01M 8/04313; H01M 8/0432; H01M 8/04373; H01M 8/0438; H01M 8/04425; H01M 8/04694; H01M 8/04858; H01M 8/04925; H01M 8/04947; H01M 8/06; H01M 8/0606
See application file for complete search history.

(56) References Cited

U.S. PATENT DOCUMENTS

2011/0197566 A1 8/2011 Velkur et al.
2011/0269038 A1 11/2011 Yukimasa et al.

FOREIGN PATENT DOCUMENTS

| CN | 102272040 | 7/2014 |
| EP | 2172420 | 4/2010 |
| JP | 60-210503 | 10/1985 |
| JP | 9-199153 | 7/1997 |
| JP | 2000-268840 | 9/2000 |
| JP | 2003-287526 | 10/2003 |
| JP | 2005-206398 | 8/2005 |
| JP | 2006-315921 | 11/2006 |
| JP | 2011-168479 | 9/2011 |
| JP | 2011-207654 | 10/2011 |
| JP | 2015-150486 | 8/2015 |

OTHER PUBLICATIONS

International Preliminary Report on Patentability issued in International Application No. PCT/JP2020/015000, dated Oct. 14, 2021, along with an English translation thereof.
Extended European Search Report issued in Corresponding European Patent Application No. 20785118.9, dated Mar. 17, 2023.
Office Action issued in Corresponding CN Patent Application No. 202080026564.6, dated Oct. 12, 2023, along with an English translation thereof.
Office Action issued in Corresponding Australian Patent Application No. 2020254025, dated Nov. 22, 2022.
Office Action issued in Corresponding JP Patent Application No. 2021-512169, dated Aug. 6, 2024, along with an English translation thereof.
Office Action issued in Corresponding CN Patent Application No. 202080026564.6, dated Mar. 30, 2023, along with an English translation thereof.
Office Action issued in Corresponding JP Patent Application No. 2021-512169, dated Dec. 10, 2024, along with an English translation thereof.
Office Action issued in Corresponding JP Patent Application No. 2021-512169, dated May 7, 2024, along with an English translation thereof.
Communication Issued in Corresponding EP Patent Application No. 20785118.9, dated Nov. 24, 2022.

* cited by examiner

HYDROGEN PRODUCTION APPARATUS AND HYDROGEN PRODUCTION METHOD

TECHNICAL FIELD

This application is a national stage application, under 35 U.S.C. § 371, of PCT/JP2020/015000, now WO 2020/204064, filed Apr. 1, 2020, which claims the benefit of priority from prior Japanese Patent Application No. JP2019-071495, filed on Apr. 3, 2019 in Japan, the contents of which are incorporated herein.

The present invention relates to a hydrogen production apparatus and a hydrogen production method, and for example, relates to an apparatus and a method of producing a hydrogen gas that is used in a hydrogen station configured to fill a fuel cell vehicle (FCV) using the hydrogen gas as a power source with the hydrogen gas.

BACKGROUND ART

In recent years, as a fuel for automobiles, a hydrogen fuel has attracted attention as a clean energy source in addition to conventional fuel oils such as gasoline. Along with this, development of the FCV using hydrogen fuel as a power source is in progress. Examples of a hydrogen station for the FCV include a hydrogen shipping center or an on-site hydrogen station (hereinafter, referred to as "on-site ST") that becomes the base of hydrogen production, and an off-site hydrogen station (hereinafter, referred to as "off-site ST") that receives hydrogen from the hydrogen production base (the hydrogen shipping center, the on-site ST, or the like) and sells the hydrogen. In the base of the hydrogen production for the FCV, for example, a liquefied petroleum gas (c) is used as a raw material, and high-purity hydrogen is produced by a catalytic reaction by the hydrogen production apparatus (for example, refer to Patent Literature 1).

It is necessary that the quality of the hydrogen gas fed to the FCV is based on ISO international standard 14687-2. The ISO international standard defines components having an adverse effect on the performance of a fuel cell stack of the FCV among impurity components which may be contained from raw materials or air in various hydrogen production methods. Here, in a hydrogen production apparatus that produces hydrogen from hydrocarbon-based raw material by the catalytic reaction, in order to comply with the strict ISO international standard, it is necessary to adjust operation load to maintain the quality of the hydrogen gas in a case where performance deterioration of a catalyst, physical deterioration of the catalyst, or the like occurs. However, in the related art, in a case where deterioration of the quality of the hydrogen gas is recognized, an operator consults a person in charge of a hydrogen production apparatus manufacturer, determines the operation load on the basis of experience or the like, and operates the hydrogen production apparatus in the hydrogen station by changing the operation load. Therefore, in an adjustment method in the related art, there is a problem that it takes effort and time for determination of the operation load and actual operation. Accordingly, before the quality of the hydrogen gas deteriorates beyond a quality reference such as the ISO international standard, it is required to find signs of performance deterioration of the catalyst, physical deterioration of the catalyst, or the like and adjust the operation load timely.

PRIOR ART DOCUMENTS

Patent Literature

Patent Literature 1: JP-A-2015-150486

SUMMARY OF INVENTION

Technical Problem

Here, an aspect of the invention provides a hydrogen production apparatus and a hydrogen production method which are capable of finding signs of performance deterioration of the catalyst, physical deterioration of the catalyst, or the like and is capable of timely adjusting operation load before the quality of the hydrogen gas deteriorates beyond a quality reference such as the ISO international standard.

Solution to Problem

According to one aspect of the present invention, a hydrogen production apparatus includes
  a hydrogen production mechanism configured to produce a hydrogen gas from a raw material by using a catalyst; and
  an operation control circuit configured to control an operation maximum load of the hydrogen production mechanism to be variable in correspondence with a parameter value as an index indicating a state of the catalyst.

According to another aspect of the present invention, a hydrogen production method includes
  producing a hydrogen gas from a raw material by using a catalyst with a hydrogen production mechanism; and
  controlling an operation maximum load of the hydrogen production mechanism to be variable in correspondence with a parameter value as an index indicating a state of the catalyst.

According to yet another aspect of the present invention, a hydrogen production apparatus includes
  a hydrogen production mechanism configured to produce a hydrogen gas from a raw material by using a catalyst; and
  an operation control circuit configured to input a parameter value as an index indicating a state of the catalyst, and configured to control an operation maximum load of the hydrogen production mechanism to be variable in correspondence with the parameter value.

In addition, the hydrogen production mechanism may produce the hydrogen gas by a steam reforming method by using a reformer including a reforming tube, the catalyst being mounted in the reforming tube, and
  the operation control circuit controls the operation maximum load to be decreased in a case where a temperature of the reforming tube is input as the parameter, and the temperature of the reforming tube exceeds a threshold value set in advance.

Alternatively, the hydrogen production mechanism may produce the hydrogen gas by a steam reforming method by using a reformer including a plurality of reforming tubes, the catalyst being mounted in each of the plurality of reforming tubes, and
  the operation control circuit controls the operation maximum load to be decreased in a case where temperatures of plurality of reforming tubes are input as the parameter, and a temperature difference between the plurality of reforming tubes exceeds a threshold value set in advance.

In addition, the operation control circuit may control the operation maximum load to be decreased in a case where a pressure on an upstream side of the reformer and a pressure on a downstream side of the reformer are input as the parameter, and a difference pressure between the pressure on the upstream side and the pressure on the downstream side exceeds a threshold value set in advance.

In addition, the operation control circuit may input a plurality of parameter values as an index indicating a state of the catalyst, and controls the operation maximum load to any one of a plurality of stages of load in correspondence with a combination of states of the plurality of parameters.

In addition, the operation control circuit may perform control of changing the operation maximum load for each predetermined period.

According to yet another aspect of the present invention, a hydrogen production method includes manufacturing a hydrogen gas from a raw material by using a catalyst in a hydrogen production apparatus; and inputting a parameter value as an index indicating a state of the catalyst and controlling an operation maximum load of the hydrogen production apparatus to be variable in accordance with the parameter value.

Advantageous Effects of Invention

According to the aspect of the invention, it is possible to find signs of performance deterioration of the catalyst, physical deterioration of the catalyst, or the like and it is possible to timely adjust operation load before the quality of the hydrogen gas deteriorates beyond a quality reference such as the ISO international standard.

DESCRIPTION OF EMBODIMENTS

Embodiment 1

Figure 1:
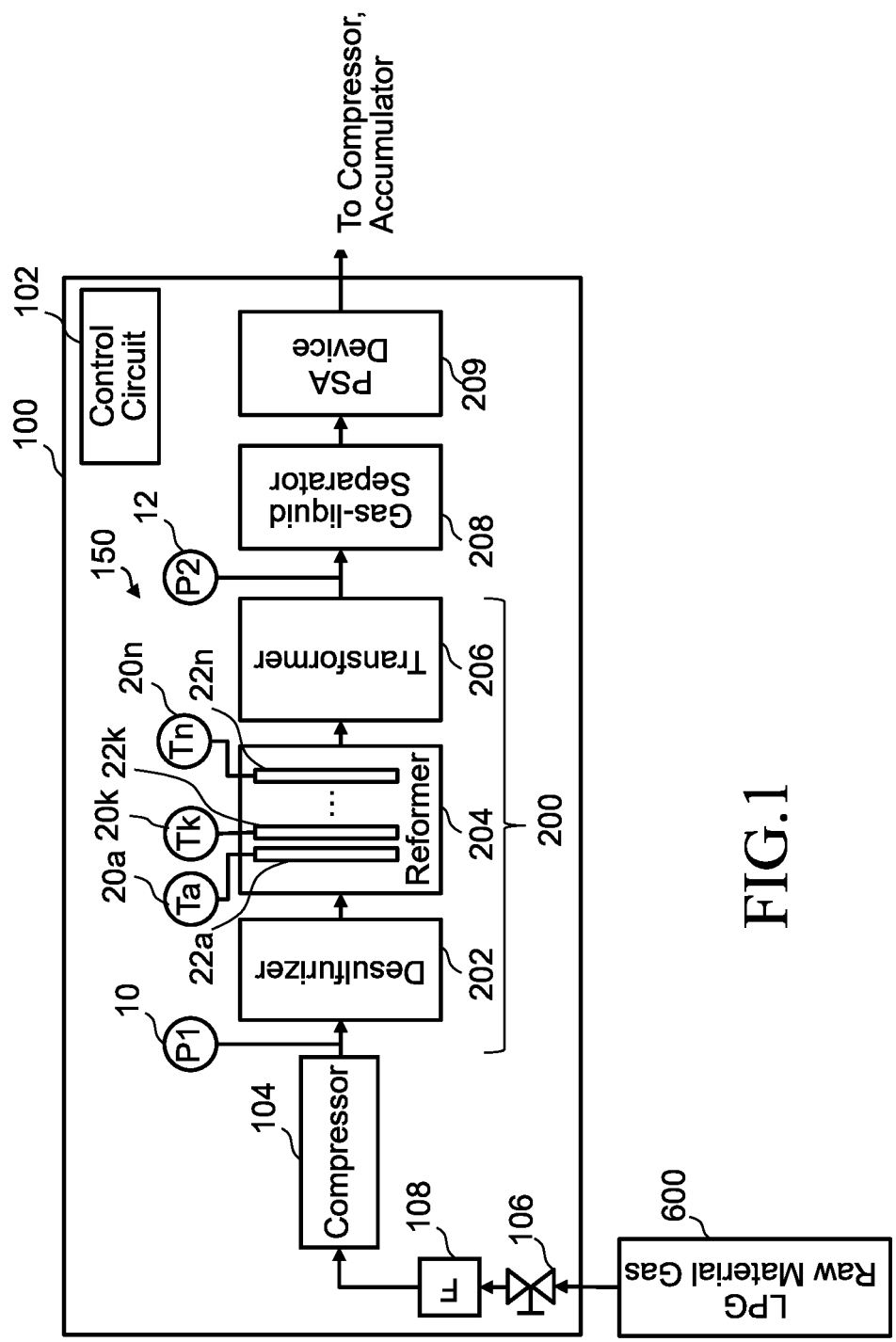
FIG. 1 is an example of a configurational diagram illustrating a configuration of a hydrogen production apparatus in an embodiment.

FIG. 1 is an example of a configuration diagram illustrating a configuration of a hydrogen production apparatus in an embodiment. In FIG. 1, a hydrogen production apparatus (HPU) 100 includes a control circuit 102 that controls the entirety of the hydrogen production apparatus 100, and a hydrogen production mechanism 150. The hydrogen production mechanism 150 includes a flow rate adjustment valve 106, a flow meter 108, a compressor 104, a steam reformer 200, a gas-liquid separator 208, and a pressure swing absorption (PSA) device 209. A desulfurizer 202, a reformer 204, and a transformer 206 are disposed in the steam reformer 200. The hydrogen production apparatus 100 is disposed in a hydrogen production base (for example, a hydrogen shipping center or an on-site ST), and produces a high-purity hydrogen gas, for example, by causing a raw material gas inside a tank 600 to pass through the desulfurizer 202, the reformer 204, the transformer 206, the gas-liquid separator 208, and the PSA device 209 in this order.

As a raw material, hydrocarbon compounds can be used. Specific examples of the hydrocarbon compounds include chain saturated aliphatic hydrocarbon such as ethane, propane, butane, pentane, hexane, heptane, octane, and structural isomers thereof, chain unsaturated aliphatic hydrocarbon such as ethylene, propylene, butene, pentene, hexene, heptene, octene, and structural isomers thereof, cyclic hydrocarbon such as cyclopentane, cyclohexane, cycloheptane, cyclooctane, and structural isomers thereof, aromatic hydrocarbon such as benzene, toluene, xylene, naphthalene, biphenyl, and compounds thereof having a substituent, and the like. The hydrocarbon compounds are contained as single substance or a mixture. For example, a city gas, a natural gas, a liquefied petroleum gas (LPG), naphtha, gasoline, kerosene, light oil, and the like can be exemplified.

In addition, as the above-described raw material, raw materials including alcohols, ethers, biofuels, and the like which are hydrocarbon compounds including a substituent containing a hetero atom can also be used. Examples of the alcohols include methanol, ethanol, and the like, examples of the ethers include dimethyl ether, examples of the biofuels include a biogas, bioethanol, biodiesel, biojet, and the like.

In addition, as the above-described raw material, raw materials including hydrogen, water, carbon dioxide, carbon monoxide, nitrogen, and the like can also be used. For example, as a pretreatment of the raw material, in the case of performing hydrodesulfurization is performed, residual hydrogen used in a reaction can also be used as is without being particularly separated. In the example in FIG. 1, for example, a case where the LPG is used as the raw material is illustrated. As the raw material, either a gas or a liquid is also included. Note that, in the case of a liquid, the liquid is supplied after being vaporized.

A plurality of reforming tubes 22($a$ to $n$) are disposed in the reformer 204, and a temperature of each of the reforming tubes 22(*a* to *n*) is individually measured by each corresponding thermometer 20 among a plurality of thermometers 20(*a* to *n*). In addition, a pressure P1 on an upstream side of the reformer 204 and a pressure P2 on a downstream side of the reformer 204 are measured by pressure gauges 10 and 12, respectively. In the example illustrated in FIG. 1, for example, the pressure gauge 10 measures the pressure P1 on an upstream side of the desulfurizer 202. The pressure gauge 12 measures the pressure P2 on a downstream side of the transformer 206.

The hydrogen production mechanism 150 produces a hydrogen gas from the raw material by using a catalyst. In other words, the hydrogen production mechanism 150 produces the hydrogen gas by a steam reforming method by using the reformer 204 including the reforming tubes in which the catalyst is mounted. A specific operation is as follows. First, a raw material gas in the tank 600 is compressed by the compressor 104, and is transmitted to the desulfurizer 202. In the desulfurizer 202, a sulfur component in the raw material gas is removed (desulfurized) by a chemical reaction. The desulfurized raw material gas is transmitted the reformer 204 in combination with high-temperature steam, and a reformed gas such as a hydrogen ($H_2$) gas and a carbon monoxide (CO) gas are generated by steam reforming using the catalyst disposed in each of the reforming tubes 22. Next, the generated reformed gas is transmitted to the transformer 206, and in the transformer 206, a carbon monoxide gas reacts with steam (shift reaction), and a hydrogen gas is further generated. In addition, the generated gas is transmitted to the PSA device 209, and impurities in the gas are removed by a pressure swing absorption method, and a high-purity hydrogen gas is produced. The hydrogen gas produced by the hydrogen production apparatus 100 disposed in the hydrogen shipping center is accumulated in an accumulator or a hydrogen trailer. In addition, the hydrogen gas is shipped to the off-site ST. The hydrogen gas produced by the hydrogen production apparatus 100 disposed in the on-site ST is accumulated in an intermediate accumulator or a high-pressure accumulator by a compressor to prepare filling of an FCV.

Figure 2:
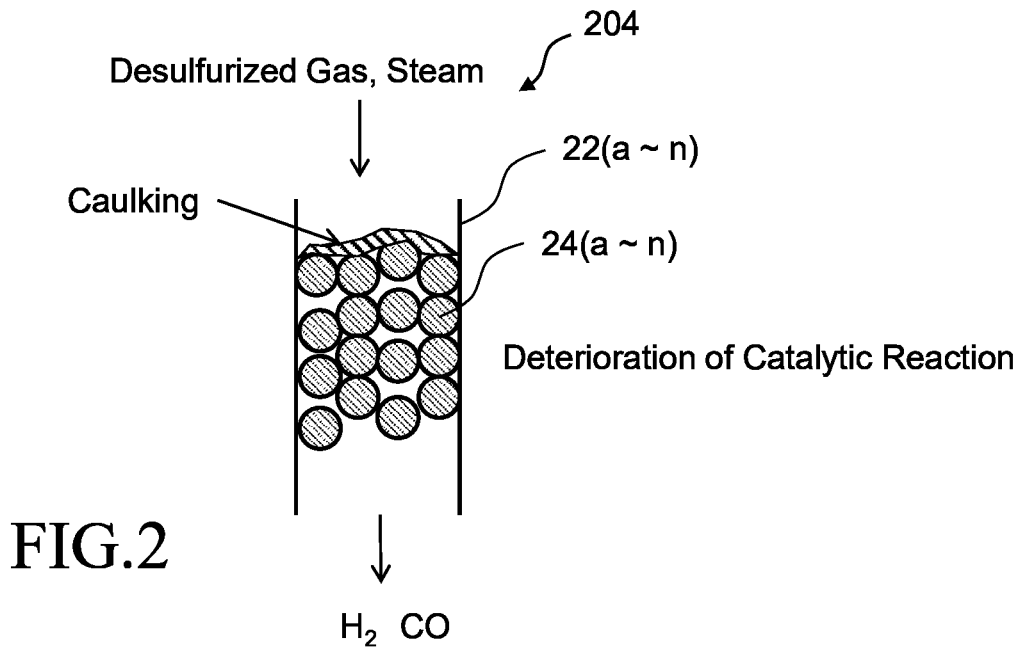
FIG. 2 is a view for describing an example of performance deterioration of a catalyst in Embodiment 1.

FIG. 2 is a view for describing an example of performance deterioration of the catalyst in Embodiment 1. In FIG. 2, as described above, catalysts 24(*a* to *n*) are disposed in the reforming tubes 22(*a* to *n*), respectively. As the catalysts 24, for example, a nickel-based catalyst in which nickel is carried by a carrier such as alumina, a noble metal-based catalyst using a noble metal such as ruthenium and rhodium, or the like can be used. For example, the inside of the reforming tubes 22 is exposed to a high temperature of, for example, 750° C. to 850° C. When the number of times of operation of the hydrogen production apparatus 100 increases, caulking may occur on surfaces of the catalysts 24 as illustrated in FIG. 2. When the caulking occurs on the surfaces of the catalysts 24, this results in clogging of the reforming tube 22. As a result, a gas passing through the reforming tube 22 decreases, and the amount of production of the hydrogen gas decreases. In addition, the catalysts 24 may be inactive due to the caulking occurred on the surfaces of the catalysts 24. In this case, the amount of the catalysts 24 capable of contributing to the steam reforming reaction decreases, and thus the performance of the catalysts deteriorates.

Figure 3:
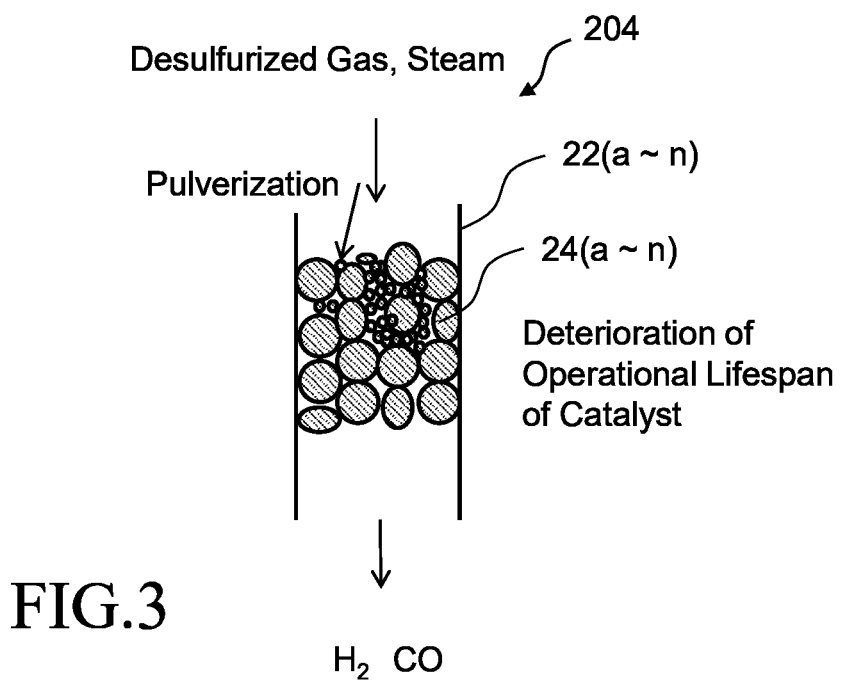
FIG. 3 is a view for describing an example of physical deterioration of the catalyst in Embodiment 1.

FIG. 3 is a view for describing an example of physical deterioration of the catalyst in Embodiment 1. When the number of times of operation of the hydrogen production apparatus 100 increases, pulverization occurs in the reforming tube 22 due to mutual contact between the catalysts 24 as illustrated in FIG. 3. When physical deterioration such as pulverization occurs, the operational lifespan of the catalysts 24 is shortened, and this results in deterioration of the performance of the catalysts. In addition, when pulverization of the catalysts 24 progresses, this may result in clogging of the reforming tube 22 in some cases.

As described above, in a case where the performance deterioration of the catalysts 24, the physical deterioration of the catalysts 24, or the like occurs, the steam reforming reaction becomes slow. Accordingly, discharge from the reformer 204 occurs in an insufficient steam reforming state. Accordingly, in the hydrogen production apparatus 100, it is necessary to reduce the supply amount of the raw material introduced to the reformer 204 to be appropriate for the amount of the catalysts 24 capable of contributing the steam reforming reaction, in other words, it is necessary to decrease operation load. Here, in Embodiment 1, the state of the performance deterioration of the catalysts 24 and/or the pulverization (physical deterioration) state of the catalysts 24 are determined by monitoring a temperature of the reforming tube 22 and a pressure loss of the reformer 204 as a parameter. Hereinafter, description will be given in detail.

Figure 4:
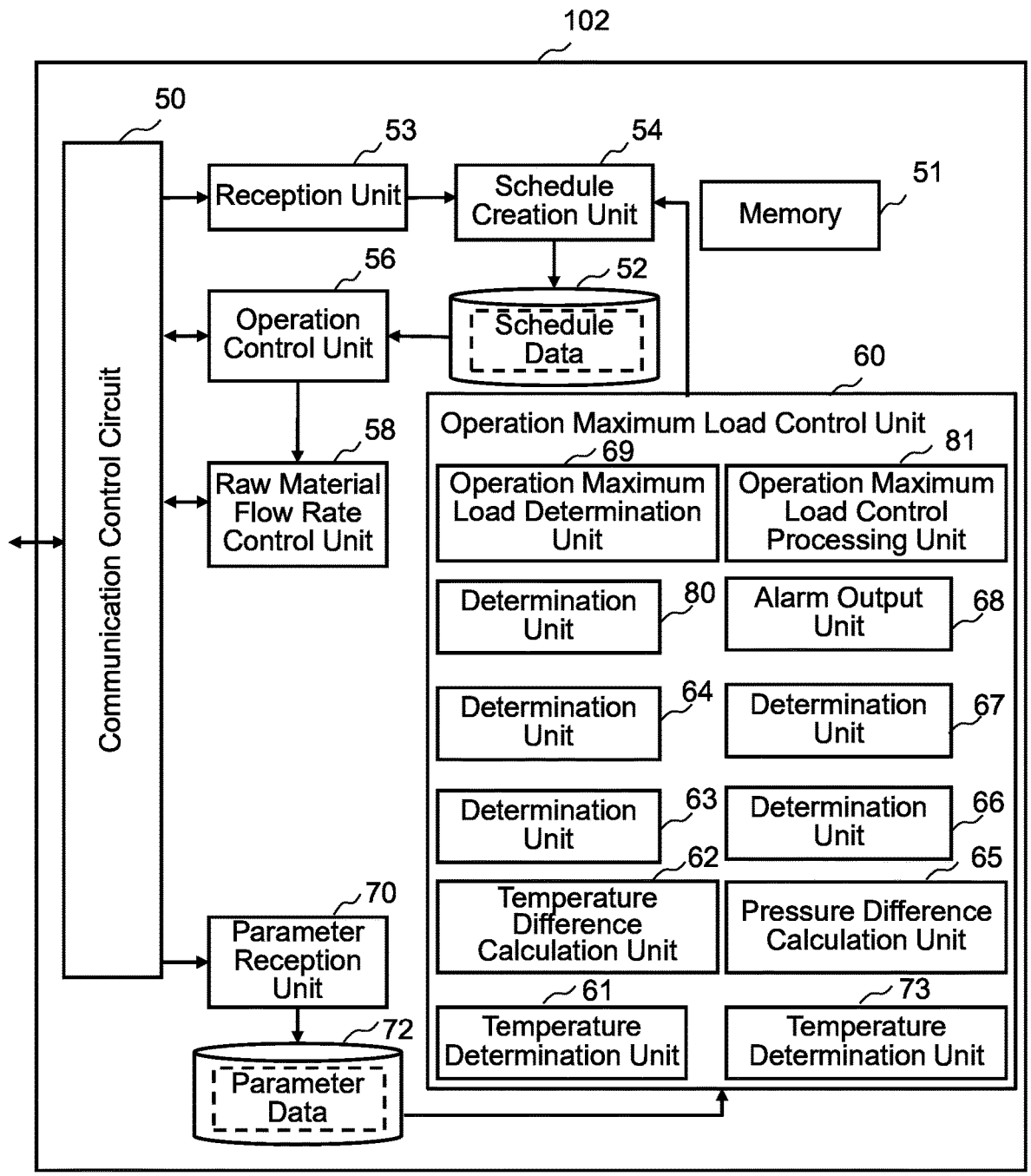
FIG. 4 is a configuration diagram illustrating an example of an internal configuration of a control circuit in Embodiment 1.

FIG. 4 is a configuration diagram illustrating an example of an internal configuration of the control circuit in Embodiment 1. In FIG. 4, a communication control unit 50, a memory 51, a reception unit 53, a schedule creation unit 54, an operation control unit 56, a raw material flow rate control unit 58, an operation maximum load control unit 60, a parameter reception unit 70, and storage devices 52 and 72 such as a magnetic disk device are disposed in the control circuit 102. A temperature determination unit 61, a temperature difference calculation unit 62, a determination unit 63, a determination unit 64, a pressure difference calculation unit 65, a determination unit 66, a determination unit 67, an alarm output unit 68, an operation maximum load determination unit 69, a temperature determination unit 73, a determination unit 80, and an operation maximum load control processing unit 81 are disposed in the operation maximum load control unit 60. The respective parts such as the reception unit 53, the schedule creation unit 54, the operation control unit 56, the raw material flow rate control unit 58, the operation maximum load control unit 60, and the parameter reception unit 70 include a processing circuit, and an electric circuit, a computer, a processor, a circuit substrate, a semiconductor device, or the like is included in the processing circuit. In addition, the respective parts may use a common processing circuit (the same processing circuit). Alternatively, difference processing circuits (individual processing circuits) may be used. Input data or a calculated result necessary in the reception unit 53, the schedule creation unit 54, the operation control unit 56, the raw material flow rate control unit 58, the operation maximum load control unit 60, and the parameter reception unit 70 is stored in the memory 51 each time or as necessary.

Figure 5:
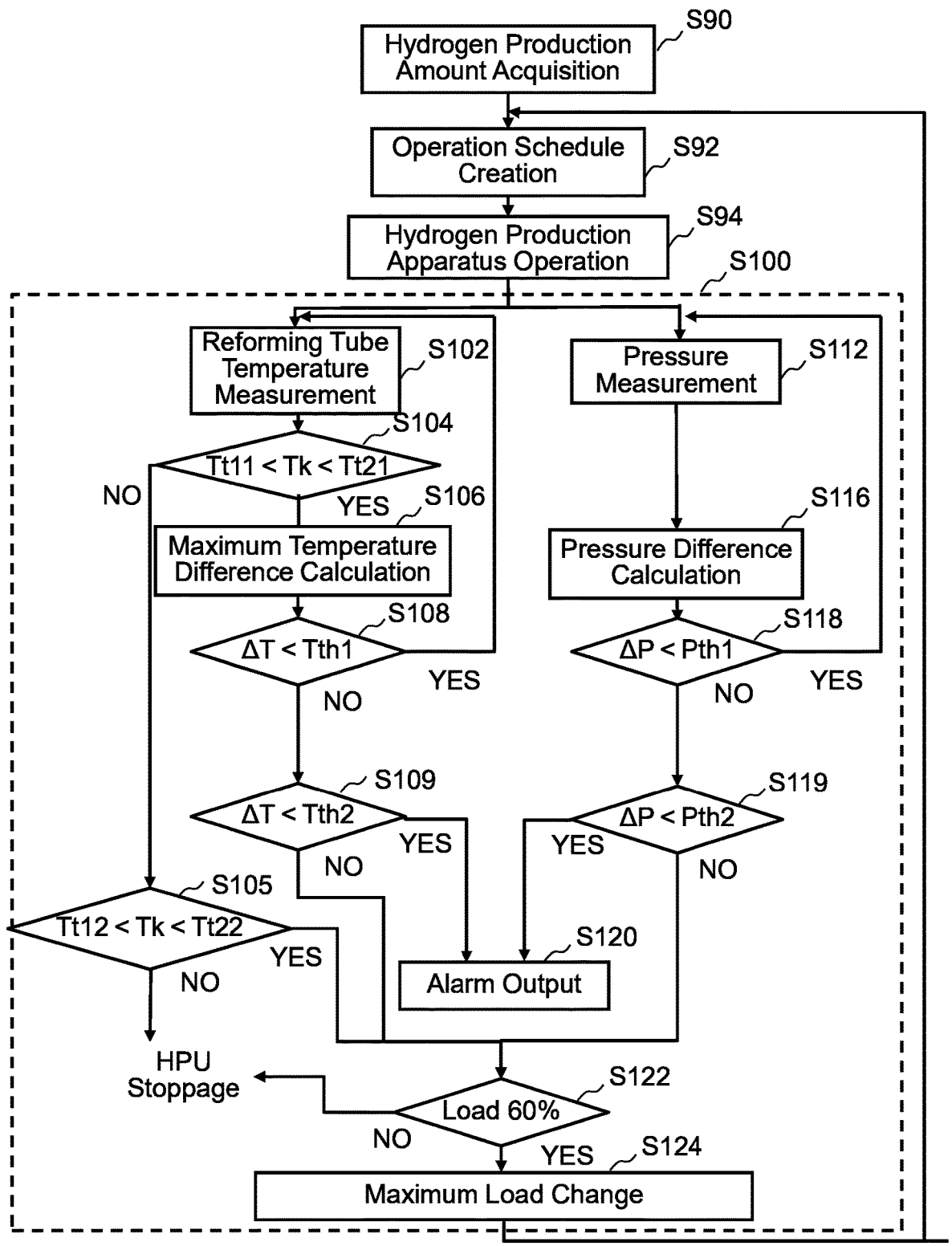
FIG. 5 is a flowchart illustrating an example of main processes of a hydrogen production method in Embodiment 1.

FIG. 5 is a flowchart illustrating an example of main processes of the hydrogen production method according to Embodiment 1. In FIG. 5, the hydrogen production method according to Embodiment 1 carries out a series of processes such as a hydrogen production amount acquisition process (S90), an operation schedule creation process (S92), a hydrogen production apparatus operation process (S94), and an operation maximum load control process (S100). The operation maximum load control process (S100) carries out a series of processes such as a reforming tube temperature measurement process (S102), a determination process (S104), a determination process (S105), a maximum temperature difference calculation process (S106), a determination process (S108), a determination process (S109), a pressure measurement process (S112), a pressure difference calculation process (S116), a determination process (S118), a determination process (S119), an alarm output process (S120), a determination process (S122), and a maximum load changing process (S124) as internal processes.

First, for example, a hydrogen production amount per one day, which is obtained by predicting the demand or the like at the outside of the hydrogen production apparatus 100, is determined.

As the hydrogen production amount acquisition process (S90), the reception unit 53 receives information on the hydrogen production amount to be produced by the hydrogen production apparatus 100 through the communication control unit 50. For example, information on a hydrogen production amount required tomorrow (next day of the reception day) is received. Alternatively, if the time is still before initiation of operation of the hydrogen production apparatus 100, information on the hydrogen production amount required today (the reception day) may be received. Note that, the information on the hydrogen production amount may be information required at a designated day without limitation to the information required at the next day of the reception day in the reception unit 53, and the information required at the reception day.

As the operation schedule creation process (S92), the schedule creation unit 54 creates an operation schedule of the hydrogen production apparatus 100 in accordance with the received information on the hydrogen production amount. For example, an operation schedule for tomorrow (the next day of the reception day) is created. Alternatively, if the time is still before initiation of the operation of the hydrogen production apparatus 100, an operation schedule for today (the reception day) is created. Note that, creation of the operation schedule may be performed for the designated day without limitation to the next day of the reception day or the reception day.

Figure 6:
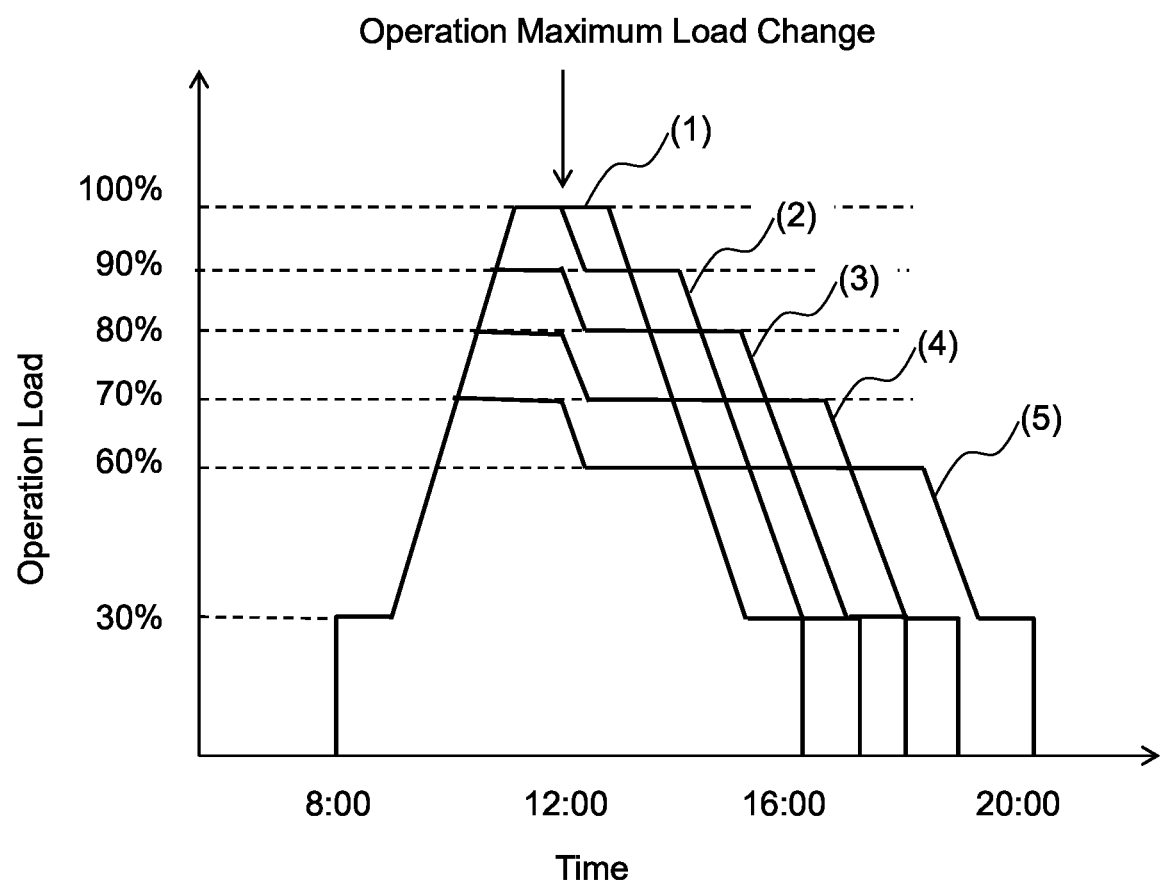
FIG. 6 is a view illustrating an example of an operation schedule of the hydrogen production apparatus in Embodiment 1.

FIG. 6 is a view illustrating an example of the operation schedule of the hydrogen production apparatus in Embodiment 1. In FIG. 6, the vertical axis represents operation load of the hydrogen production apparatus 100. The horizontal axis represents time in the operation day. The example in FIG. 6 illustrates a case where the operation of the hydrogen production apparatus is initiated at 8:00. The operation load of the hydrogen production apparatus has an influence directly on the amount of hydrogen gas that can be produced, and thus it is not preferable to decrease the operation load unnecessarily. According to this, the hydrogen production apparatus is required to operate at load as high as possible. As an adjustment method of the operation load, in the related art, an operator consults a person in charge of the hydrogen production apparatus manufacturer, determines the operation load on the basis of experience or the like, and operates the hydrogen production apparatus in the hydrogen station by changing the operation load. Therefore, the following problem exists. Specifically, it cannot be said that an operation maximum load of the hydrogen production apparatus can be adjusted to a value near the upper limit at which operation is possible at actual performance of a catalyst or the like. Here, in Embodiment 1, a pressure difference (pressure loss) based on a pressure, and a temperature parameter are used as an index, and the operation maximum load is adjusted so that the operation load is not decreased unnecessarily (in order to maintain a state in which the operation load is closer to an operational upper limit by estimating the state of the catalysts 24) while grasping the state of the catalysts 24. Here, the operation maximum load represents operation load in the rated (100%) operation of the hydrogen production apparatus.

In a state in which deterioration of the catalysts 24 does not occur (for example, a state in which the catalysts 24 are not used), the schedule creation unit 54 creates Operation Schedule (1) on the assumption that operation maximum load is 100%. In Operation Schedule (1), for example, operation of the hydrogen production apparatus 100 is initiated, for example, from 8:00 am at operation load of approximately 30% (warm-up operation (idling)). In addition, the operation load is gradually increased from idling termination time (for example, 8:30) at an acceleration set in advance (for example, several %/minute) until reaching operation load of 100%. The example in FIG. 6 illustrates a case where operation (rated operation) is performed at operation load of 100%, for example, from 11:00 to 13:00. In addition, the operation load is decreased until reaching idling load (operation load of approximately 30%) is decreased from 13:00 at a deceleration set in advance (for example, several %/minute), and idling is initiated (an idling state is maintained). In addition, the operation of the hydrogen production apparatus is terminated (stopped) at idling termination time (for example, 16:00). In this case, a hydrogen gas in an amount corresponding to an area (an integrated value of a graph) surrounded by a graph of Operation Schedule (1) and the horizontal axis can be produced. Here, an increase and a decrease of the operation load may be performed at an acceleration set in advance, or at a constant speed set in advance (for example, several %/minute). Note that, a case where the operation load is set to 100% represents a rated operation of the hydrogen production apparatus 100 and represents a case where of carrying out an operation method of producing the maximum amount of hydrogen gas that can be typically produced in the hydrogen production apparatus 100. In addition, for example, operation load of 80% represents the case of carrying out an operation method of producing the hydrogen gas corresponding to 80% of the maximum amount of the hydrogen gas (the production amount of the hydrogen gas at the operation load of 100%) that can be typically produced. Data of created operation schedule (schedule data) is stored in the storage device 52.

Note that, the above-described example illustrates a case where creation of the operation schedule is performed in the hydrogen production apparatus 100, but there is no limitation to this case. The operation schedule of the hydrogen production apparatus 100 may be created at the outside of the hydrogen production apparatus 100. In this case, the reception unit 53 may receive data of the operation schedule (schedule data) created at the outside through the communication control unit 50, and may store the data in the storage device 52.

In FIG. 5, as the hydrogen production apparatus operation process (S94), under control of the operation control unit 56, the hydrogen production mechanism 150 in the hydrogen production apparatus 100 reads out the data of the operation schedule (schedule data) from the storage device 52, and produces the hydrogen gas in accordance with the operation schedule. The operation in this case is as described above. Here, under the control of the operation control unit 56, the raw material flow rate control unit 58 controls the degree of open of the flow rate adjustment valve 106 in conformity to the operation load, and controls a flow rate of the raw material introduced from the tank 600. The flow rate of the raw material that is measured by the flow meter 108 and introduced is fed back to the raw material flow rate control unit 58 through the communication control unit 50.

Figure 7:
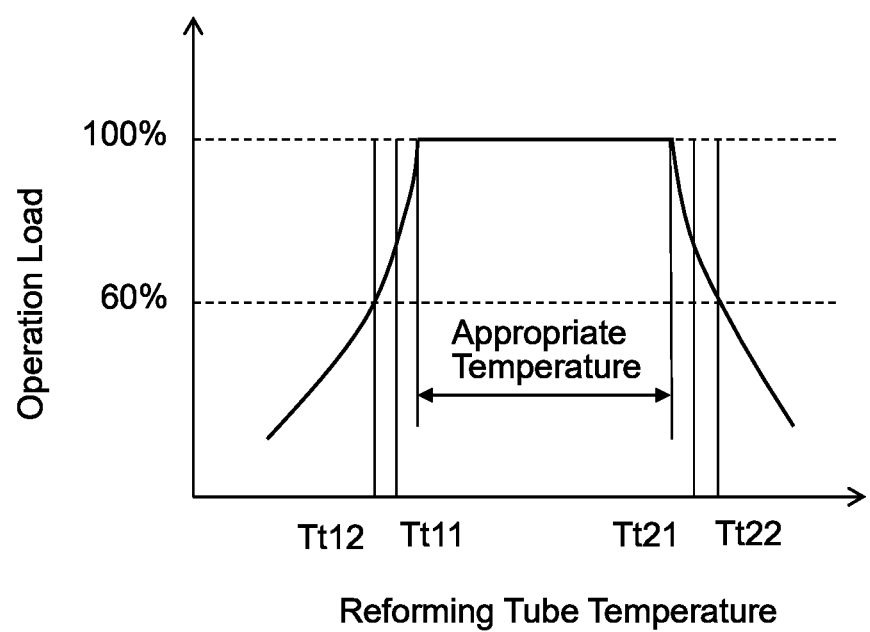
FIG. 7 is a view illustrating an example of a relationship between operation load and a reforming tube temperature in a steam reforming reaction in Embodiment 1.

FIG. 7 is a view illustrating an example of a relationship between the operation load and the reforming tube temperature in the steam reforming reaction in Embodiment 1. In FIG. 7, the vertical axis represents the operation load of the hydrogen production apparatus 100, and the horizontal axis represents the reforming tube temperature. An appropriate temperature of the reforming tube temperature exists in accordance with the operation load. The relationship may be measured through an experiment in advance. The appropriate temperature of the reforming tube temperature in the case of operation at operation load of 100% is, for example, 750° C. to 850° C. When the catalysts 24 deteriorate, the temperature of the reforming tube 22 increases, and may be higher than the appropriate temperature. Accordingly, the state of the catalysts 24 can be grasped (estimated) by monitoring the temperature of the reforming tube 22. In addition, the reforming reaction in the reformer 204 is an endothermic reaction. Accordingly, for example, in a case where some catalysts 24 of the reforming tube 22 deteriorates, clogging occurs, and the reforming reaction does not progress, a gas that cannot be introduced into the reforming tube 22 may flow into another reforming tube 22 for reaction, and thus a reforming reaction in the other reforming tube 22 excessively progresses. Accordingly, in the reforming tube 22 in which the reaction is excessive, since heat is taken away due to the endothermic reaction, the temperature of the reforming tube 22 may be further lowered than the appropriate temperature in contrast. In addition, in a temperature range deviating from the appropriate temperature, a sufficient reaction becomes difficult, and this leads to quality deterioration of the hydrogen gas. Accordingly, when rising or lowering of the temperature of the reforming tube 22 can be detected, it is possible to maintain the quality of the hydrogen gas within a quality reference before the quality of the hydrogen gas deteriorates beyond the quality reference (for example, the ISO international standard) by decreasing the operation load.

In addition, in the pulverized catalysts 24 as illustrated in FIG. 3, a sufficient reaction is difficult to occur. When pulverization of the catalysts 24 occurs, a gas flow passage in the reforming tube 22 is narrowed, and thus conductance decreases. Accordingly, a pressure loss occurs. Accordingly, when the pressure loss of the reformer 204 can be detected, it is possible to decrease the operation load before the quality of the hydrogen gas deteriorates beyond the quality reference (for example, the ISO international standard). For example, the pressure loss can be obtained by measuring a pressure difference between an inlet and an outlet of the reformer 204.

Next, in FIG. 5, as the operation maximum load control process (S100), the operation maximum load control unit 60 (an example of an operation control circuit) inputs a parameter value that becomes an index indicating (estimating) a state of the catalysts 24, and controls the operation maximum load of the hydrogen production mechanism 150 in the hydrogen production apparatus 100 to be variable in correspondence with the parameter value. Accordingly, first, the operation maximum load control unit 60 inputs the parameter value that becomes an index indicating the state of the catalysts 24, and determines the operation maximum load of the hydrogen production mechanism 150 in correspondence with the parameter value. Specifically, the operation maximum load control unit 60 inputs temperature information of the reforming tube 22 as an example of parameter that becomes an index indicating (estimating) the state of the catalysts 24, and controls the operation maximum load to be decreased in a case where the temperature of the reforming tube 22 exceeds (or falls down) a threshold temperature that is set in advance. In addition, as an example of parameter that becomes the index indicating (estimating) the state of the catalysts 24, the operation maximum load control unit 60 inputs temperature information of a plurality of the reforming tubes 22, and controls the operation maximum load to be decreased in a case where a temperature difference $\Delta T$ of the plurality of reforming tubes 22 exceeds a changing threshold value Tth2 that is set in advance. In addition, as an example of parameter that becomes the index indicating (estimating) the state of the catalysts 24, the operation maximum load control unit 60 inputs a pressure P1 on an upstream side of the reformer 204, and a pressure P2 on a downstream side of the reformer 204, and controls the operation maximum load to be decreased in a case where a difference pressure $\Delta P$ between the pressure on the upstream side and the pressure on the downstream side exceeds a changing threshold value Pth2 that is set in advance. A specific operation is as follows. Note that, in the operation maximum load control process (S100), the reforming tube temperature measurement process (S102) and the pressure measurement process (S112) are executed in parallel.

On the other hand, as the reforming tube temperature measurement process (S102), as an example of parameter that becomes an index indicating (estimating) the state of the catalysts 24, each of the thermometers 20(a to n) measures a temperature of a corresponding one of the reforming tubes 22(a to n). The measured temperature is received by the parameter reception unit 70 through the communication control unit 50, and is stored in the storage device 72 in association with measurement time (or reception time).

Figure 8:
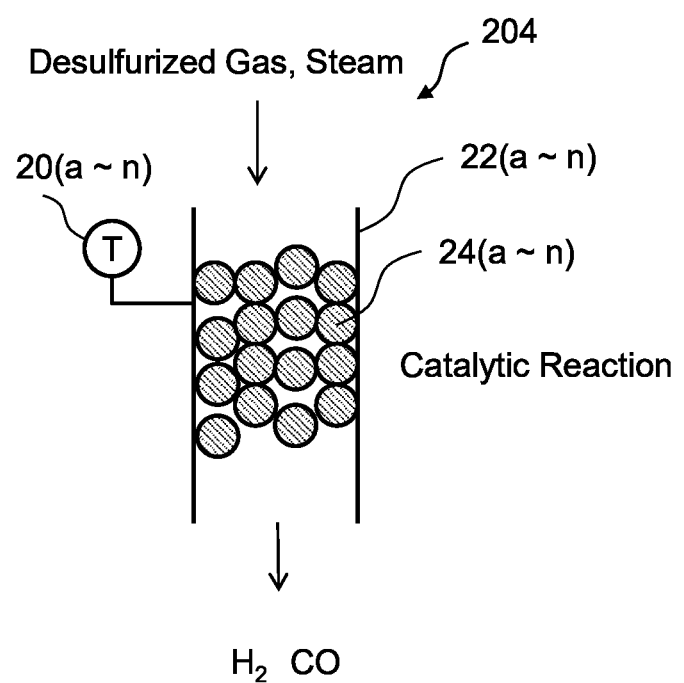
FIG. 8 is a view for describing temperature measurement of the reforming tube in Embodiment 1.

FIG. 8 is a view for describing temperature measurement of the reforming tube in Embodiment 1. As illustrated in FIG. 8, the thermometers 20(a to n) are connected to the reforming tubes 22(a to n), respectively, and temperatures Ta to Tn of the reforming tubes 22(a to n) are measured for every predetermined time. For example, in a case where 16 pieces of the reforming tubes 22 are disposed, 16 pieces of temperature data are measured for every predetermined time.

Next, in FIG. 5, as the determination process (S104), the temperature determination unit 61 reads out the temperature data of each of the reforming tubes 22(a to n) from the storage device 72, and determines whether or not the temperature Tk of the reforming tube 22k is within a range of a low-temperature-side threshold temperature Tt11 and a high-temperature-side threshold temperature Tt21 (Tt11<Tk<Tt21) for every reforming tube 22k (representing one among the reforming tubes 22(a to n)). In a case where a temperature of any one reforming tube 22 among the reforming tubes 22(a to n) deviates from the range of the low-temperature-side threshold temperature Tt11 and the high-temperature-side threshold temperature Tt21 (No in S104), the process proceeds to the determination process (S105). In a case where temperatures of all of the reforming tubes 22(a to n) are within the range of the low-temperature-side threshold temperature Tt11 and the high-temperature-side threshold temperature Tt21 (YES in S104), the process proceeds to the maximum temperature difference calculation process (S106). Here, the low-temperature-side threshold temperature Tt11 represents a lower limit side alarm threshold value of the reforming tube temperature, and when the reforming tube temperature is lower than Tt11, an alarm is issued. The high-temperature-side threshold temperature Tt21 represents an upper limit value of the reforming tube temperature, and represents an alarm threshold value for issuing of an alarm when the reforming tube temperature exceeds the temperature.

As the determination process (S105), the temperature determination unit 73 determines whether or not the temperature of the reforming tube 22$k$, which deviates from the range of the low-temperature-side threshold temperature Tt11 and the high-temperature-side threshold temperature Tt21, is within a range (Tt12<Tk<Tt22) of a low-temperature-side lower limit temperature Tt12 (Tt12<Tt11) and a high-temperature-side upper limit temperature Tt22 (Tt21<Tt22). In a case where the temperature of the reforming tube 22$k$ deviates from the range of the low-temperature-side lower limit temperature Tt12 and the high-temperature-side upper limit temperature Tt22 (NO in S105), the hydrogen production apparatus 100 is stopped because it exceeds the changing temperature. Specifically, after receiving a command from the operation maximum load control unit 60, the operation control unit 56 stops the operation of the hydrogen production mechanism 150 in the hydrogen production apparatus 100. Here, the low-temperature-side lower limit temperature Tt12 represents a lower-limit-side shut-down threshold value of the reforming tube temperature, and when the temperature of the reforming tube is lower than Tt12, the hydrogen production apparatus 100 is stopped. The high-temperature-side upper limit temperature Tt22 represents an upper limit value of the reforming tube temperature, and when exceeding the temperature, the hydrogen production apparatus 100 is stopped. The changing temperature is a temperature for changing (decreasing) the load of the hydrogen production apparatus when exceeding the temperature. In the case of stopping the operation of the hydrogen production mechanism 150 in the hydrogen production apparatus 100, it is preferable that the hydrogen production mechanism 150 is decelerated at the above-described deceleration speed, and is stopped after undergoing the idling operation. Note that, a hydrogen gas that is produced after deviating from the range of the low-temperature-side lower limit temperature Tt12 and the high-temperature-side upper limit temperature Tt22 may be discarded from a vent line (not illustrated) for remaining the quality of the hydrogen gas to be produced. In addition, after stopping the operation of the hydrogen production mechanism 150 in the hydrogen production apparatus 100, re-activation is progressed after replacing the reforming catalysts 24 of the reforming tube 22$k$ deviating from the range of Tt12<Tk<Tt22. In a case where the temperature of the reforming tube 22$k$ deviates from the range of the low-temperature-side threshold temperature Tt11 and the high-temperature-side threshold temperature Tt21, and is within a range of the low-temperature-side lower limit temperature Tt12 and the high-temperature-side upper limit temperature Tt22 (YES in S105), the process proceeds to the determination process (S122).

As the maximum temperature difference calculation process (S106), the temperature difference calculation unit 62 calculates a difference (temperature difference $\Delta T$) between the highest temperature and the lowest temperature among the temperatures of the plurality of reforming tubes 22($a$ to $n$). For example, in a case where 16 pieces of the reforming tubes 22 are disposed in the reformer 204, the temperature difference calculation unit 62 calculates the temperature difference $\Delta T$ by subtracting a temperature Tmin of the reforming tube 22 at which the lowest temperature is measured from a temperature Tmax of the reforming tube 22 at which the highest temperature is measured among the 16 reforming tubes 22.

Next, as the determination process (S108), the determination unit 63 determines whether or not the calculated temperature difference $\Delta T$ is lower than an alarm threshold value Tth1. Here, the alarm threshold value Tth1 represents a threshold value for issuing an alarm when the temperature difference between the highest temperature and the lowest temperature of several reforming tubes increases further than the threshold value.

Figure 9:
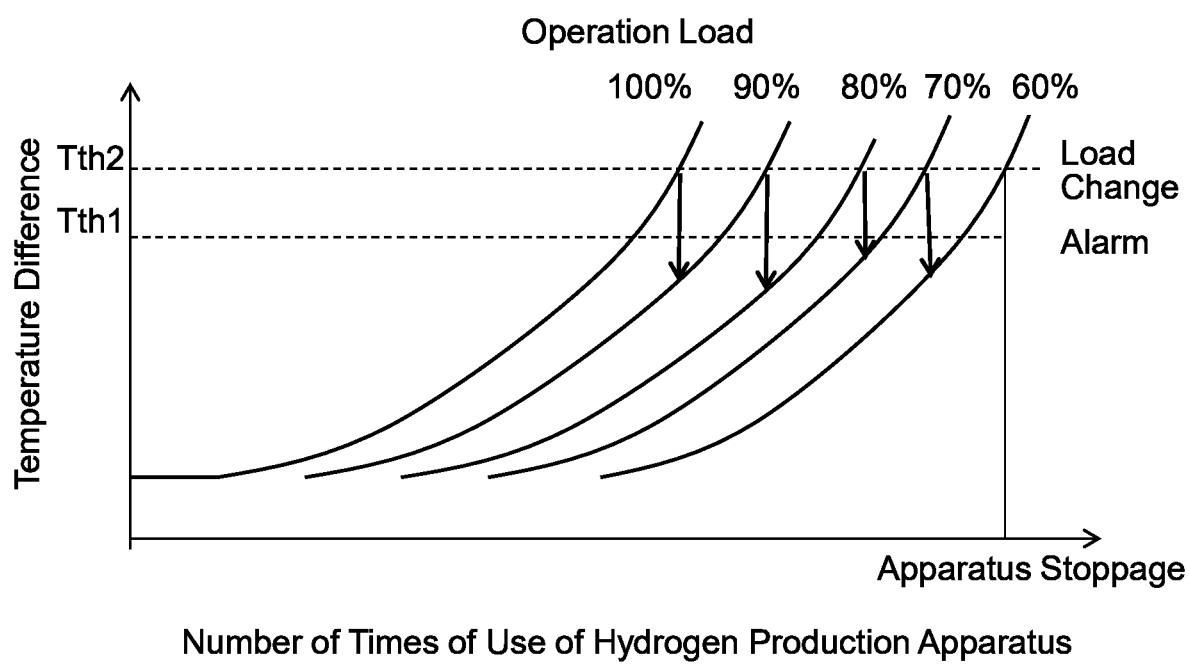
FIG. 9 is a view illustrating an example of a relationship between a temperature difference, the number of times of use of the hydrogen production apparatus, and the operation load in Embodiment 1.

Here, FIG. 9 is a view illustrating an example of a relationship between the temperature difference, the number of times of use of the hydrogen production apparatus, and the operation load in Embodiment 1. In FIG. 9, the vertical axis represents the temperature difference $\Delta T$. The horizontal axis represents the number of times of use of the hydrogen production apparatus 100. FIG. 9 illustrates a relationship in a case where operation is performed when the operation load of the hydrogen production apparatus 100 is set to, for example, 100%, 90%, 80%, 70%, and 60%, respectively. The relationship may be obtained in advance through an experiment or the like. For example, a result in a case where operation is continuously performed at a corresponding operation load for several hours (for example, 3 to 6 hours) in each use time of the hydrogen production apparatus 100 is illustrated. The temperature difference $\Delta T$ increases as the number of times of use of the hydrogen production apparatus increases regardless of the operation load. In addition, the larger the operation load is, the earlier the temperature difference $\Delta T$ initiates to increase. Accordingly, the larger the operation load is, the faster the temperature difference $\Delta T$ reaches the alarm threshold value Tth1. Conversely, the smaller the operation load is, it is possible to increase the number of times of use of the hydrogen production apparatus until the temperature difference $\Delta T$ reaches the alarm threshold value Tth1. In a case where the calculated temperature difference $\Delta T$ is lower than the alarm threshold value Tth1 (YES in S108), there is no problem even though the operation continues still at the current operation maximum load (at that time). Accordingly, the process returns to the reforming tube temperature measurement process (S102), and the same processes are repeated. When the calculated temperature difference $\Delta T$ is not lower than the alarm threshold value Tth1 (NO in S108), the process proceeds to the determination process (S109).

In FIG. 5, as the determination process (S109), the determination unit 64 determines whether or not the calculated temperature difference $\Delta T$ is lower than the changing threshold value Tth2. It can be said that the possibility of increasing the number of times of use of the hydrogen production apparatus until the temperature difference $\Delta T$ reaches the alarm threshold value Tth1 is also true of the changing threshold value Tth2 having a higher temperature difference in comparison to the alarm threshold value Tth1. Here, the changing threshold value Tth2 is a threshold value for changing (decreasing) the operation load of the hydrogen production apparatus 100 when a temperature difference between the highest temperature and the lowest temperature among several reforming tubes is higher than the changing threshold value Tth2. In a case where the calculated temperature difference $\Delta T$ is lower than the changing threshold value Tth2 (YES in S109), the process proceeds to the alarm output process (S120). In a case where the calculated temperature difference $\Delta T$ is not lower than the changing threshold value Tth2 (NO in S109), the process proceeds to the determination process (S122).

On the other hand, the pressure measurement process (S112) is performed in parallel with the reforming tube temperature measurement process (S102). As the pressure measurement process (S112), as an example of parameter that becomes an index indicating (estimating) the state of the catalysts 24, the pressure gauges 10 and 12 measures a pressure P1 on an upstream side of the reformer 204, and a pressure P2 on a downstream side of the reformer 204. In the example in FIG. 1, for example, the pressure gauge 10 measures the pressure P1 on the upstream side of the desulfurizer 202 and the pressure gauge 12 measures the pressure P2 on the downstream side of the transformer 206. The measured pressures P1 and P2 are received by the parameter reception unit 70 through the communication control unit 50, and are stored in the storage device 72 in association with measurement time (or reception time).

Next, as the pressure difference calculation process (S116), the pressure difference calculation unit 65 calculate a pressure difference $\Delta P$ (difference pressure) between the pressure on the upstream side of the reformer 204 and the pressure on the downstream side thereof by subtracting the pressure P2 on the downstream side of the reformer 204 from the pressure P1 on the upstream side of the reformer 204. The pressure difference $\Delta P$ may be actually regarded as a pressure loss in the reformer 204.

Next, as the determination process (S118), the determination unit 66 determines whether or not the calculated pressure difference $\Delta P$ is lower than an alarm threshold value Pth1. The alarm threshold value Pth1 is a threshold value for issuing an alarm when the pressure difference $\Delta P$ increases further than the alarm threshold value.

Figure 10:
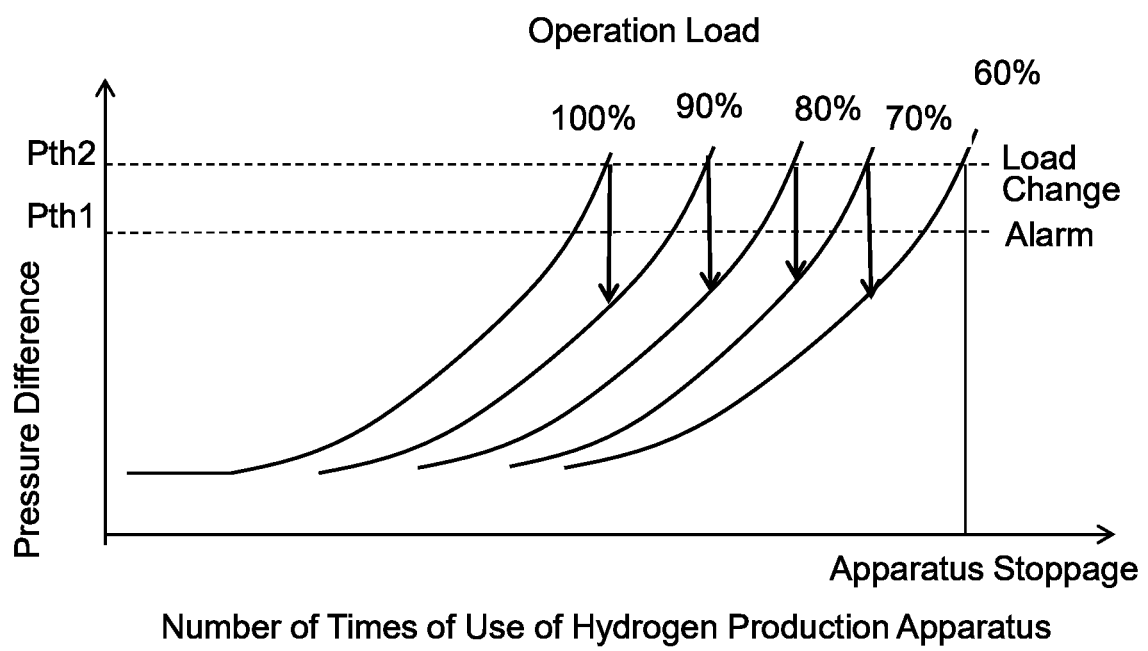
FIG. 10 is a view illustrating an example of a relationship between a pressure difference, the number of times of use of the hydrogen production apparatus, and the operation load in Embodiment 1.

FIG. 10 is a view illustrating an example of a relationship between the pressure difference and the number of times of use of the hydrogen production apparatus, and the operation load in Embodiment 1. In FIG. 10, the vertical axis represents the pressure difference $\Delta P$. The horizontal axis represents the number of times of use of the hydrogen production apparatus 100. The example in FIG. 10 illustrates a relationship in a case where operation is performed when the operation load of the hydrogen production apparatus 100 is set to, for example, 100%, 90%, 80%, 70%, and 60%, respectively. The relationship may be obtained in advance through an experiment or the like. For example, a result in a case where operation is continuously performed at a corresponding operation load for several hours (for example, 3 to 6 hours) in each use time of the hydrogen production apparatus 100 is illustrated. The pressure difference $\Delta P$ initiates to increase as the number of times of use of the hydrogen production apparatus increases regardless of the operation load and becomes higher along with the increase. In addition, the larger the operation load is, the earlier the pressure difference $\Delta P$ initiates to increase. Accordingly, the larger the operation load is, the faster the pressure difference $\Delta P$ reaches the alarm threshold value Pth1. Conversely, the smaller the operation load is, it is possible to increase the number of times of use of the hydrogen production apparatus until the pressure difference $\Delta P$ reaches the alarm threshold value Pth1. In a case where the calculated pressure difference $\Delta P$ is lower than the alarm threshold value Pth1 (YES in S118), there is no problem even though the operation continues still at the current operation maximum load (at that time). Accordingly, the process returns to the pressure measurement process (S112), and the same processes are repeated. In a case where the calculated pressure difference $\Delta P$ is not lower than the alarm threshold value Pth1 (NO in S118), the process proceeds to the determination process (S119).

Next, as the determination process (S119), the determination unit 67 determines whether or not the calculated pressure difference $\Delta P$ is lower than a changing threshold value Pth2. It can be said that the possibility of increasing the number of times of use of the hydrogen production apparatus until the pressure difference $\Delta P$ reaches the alarm threshold value Pth1 is also true of the changing threshold value Pth2 having a higher pressure difference in comparison to the alarm threshold value Pth1. Here, the changing threshold value Pth2 is a threshold value for changing (decreasing) the operation load of the hydrogen production apparatus 100 when the pressure difference $\Delta P$ increases further than the changing threshold value. In a case where the calculated pressure difference $\Delta P$ is lower than the changing threshold value Pth2 (YES in S119), the process proceeds to the alarm output process (S120). In a case where the calculated pressure difference $\Delta P$ is not lower than the changing threshold value Pth2 (NO in S119), the process proceeds to the determination process (S122).

As the alarm output process (S120), the alarm output unit 68 outputs an alarm at time when the temperature difference $\Delta T$ or the pressure difference $\Delta P$ exceeds the alarm threshold value. For example, an alarm screen is displayed on a monitor (not illustrated) of the control circuit 102. According to this, a worker can grasp that it is necessary to change the operation maximum load to be deceased from a current state (state at the alarm reception time) in the near future.

In the determination process (S122), the determination unit 80 determines whether or not the current operation maximum load is a limit maximum load (a lower limit value of the operation load) that is set in advance. For example, the limit maximum load is set to, for example, 60%. When the current operation maximum load is the limit maximum load that is set in advance (YES in S122), the hydrogen production apparatus 100 is stopped. When the current operation maximum load is not the limit maximum load that is set in advance (NO in S122), the process proceeds to the maximum load changing process (S124).

Next, as the maximum load changing process (S124), for example, in a case where the temperature difference $\Delta T$ of the plurality of the reforming tubes 22 exceeds the changing threshold value Tth2 set in advance, the operation maximum load determination unit 69 determines the operation maximum load to a setting value lowered by one rank from the current setting value. For example, when the current operation maximum load is 100% and setting lower by one rank is 90%, 90% is determined. In addition, the operation maximum load control processing unit 81 controls the operation maximum load to be decreased to a determined value (for example, 90%). Specifically, control is performed so that operation is performed with an operation schedule of the determined operation maximum load. Accordingly, a value of the determined operation maximum load and a command of decreasing the operation maximum load are output to the schedule creation unit 54. In addition, the process returns to the operation schedule creation process (S92).

In addition, next, in the operation schedule creation process (S92), the schedule creation unit 54 receives the value of the determined operation maximum load and the command of decreasing the operation maximum load, and recreates the operation schedule at the determined operation maximum load. As illustrated in FIG. 6, for example, in a case where changing (determination) of the operation maximum load exists during operation at 100% indicated by Graph (1), a schedule before the time of changing is recreated to Graph (2) set to determined operation maximum load of 90%. Similarly, for example, in a case where changing (determination) of the operation maximum load exists during operation at 90% indicated by Graph (2), a schedule before the time of changing is recreated to Graph (3) set to determined operation maximum load of 80%. Similarly, for example, in a case where changing (determination) of the operation maximum load exists during operation at 80% indicated by Graph (3), a schedule before the time of changing is recreated to Graph (4) set to determined operation maximum load of 70%. Similarly, for example, in a case where changing (determination) of the operation maximum load exists during operation at 70% indicated by Graph (4), a schedule before the time of changing is recreated to Graph (5) set to determined operation maximum load of 60%. Data of the recreated operation schedule is stored in the storage device 52 and is updated. For example, the data is overwritten.

In addition, in the hydrogen production apparatus operation process (S94), the operation control unit 56 operates by decreasing the operation maximum load in accordance with the updated operation schedule. In other words, the operation control unit 56 controls the hydrogen production mechanism 150 in the hydrogen production apparatus 100 with an operation schedule in which the operation maximum load is decreased in a case where any one reforming tube $22k$ among the reforming tubes $22(a$ to $n)$ is out of the range of the threshold temperature Tt11 and the threshold temperature Tt21, and within in the range of the lower limit temperature Tt12 and the upper limit temperature Tt2. In addition, the operation control unit 56 controls the hydrogen production mechanism 150 in the hydrogen production apparatus 100 with an operation schedule in which the operation maximum load is decreased in a case where the temperature difference ΔT of the plurality of reforming tubes 22 exceeds the changing threshold value Tth2 that is set in advance. In addition, the operation control unit 56 controls the hydrogen production mechanism 150 in the hydrogen production apparatus 100 with an operation schedule in which the operation maximum load is decreased in a case where the difference pressure ΔP between the pressure on the upstream side and the pressure on the downstream side exceeds the changing threshold value Pth2 that is set in advance.

In the above-described example, description has been given of the case of decreasing the operation maximum load during operation of the hydrogen production apparatus 100 on the day in a case where a cause for changing of the operation maximum load (a situation of exceeding the changing threshold value) occurs, but there is no limitation to the case. For example, operation may be performed according to the original operation schedule on the day, and the operation maximum load may be decreased when creating an operation schedule for the next day.

In addition, in the above-described example, each parameter value is measured at predetermined time (predetermined sampling time) during operation of the hydrogen production apparatus 100, but there is no limitation thereto. The operation maximum load control unit 60 may perform control of changing the operation maximum load for every predetermined period. For example, control of measuring each parameter value and of changing the operation maximum load may be performed every day, every other day, every two days, . . . , every week, every few weeks, every month, or every few months.

As described above, according to Embodiment 1, it is possible to find signs of performance deterioration of the catalysts 24, physical deterioration of the catalyst 24, or the like and it is possible to timely adjust the operation load before the quality of the hydrogen gas deteriorates beyond the quality reference.

Figure 11:
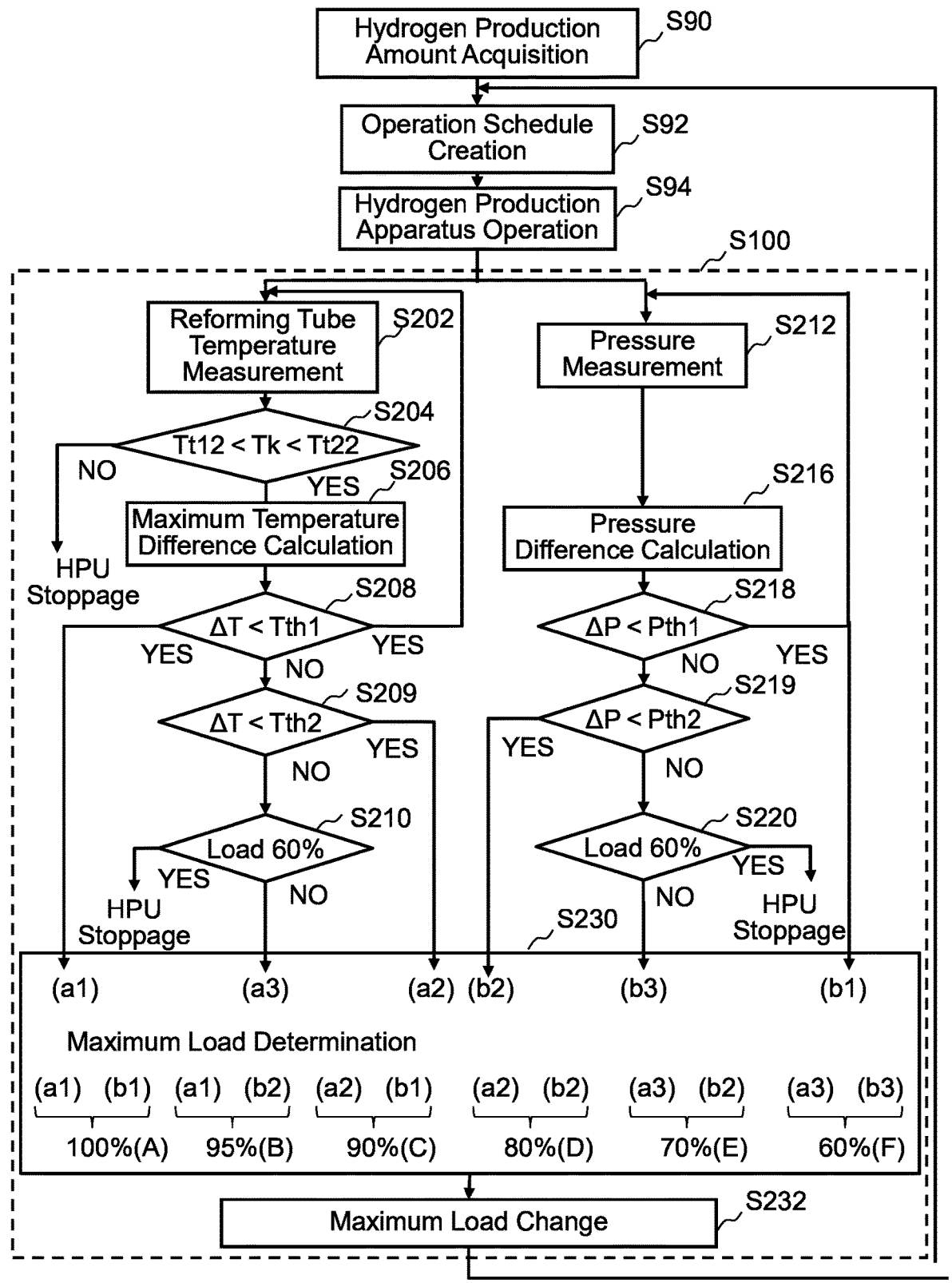
FIG. 11 is a flowchart illustrating an example of main processes of the hydrogen production method in a modification example of Embodiment 1.

FIG. 11 is a flowchart illustrating an example of main processes of a hydrogen production method according to a modification example of Embodiment 1. FIG. 11 is similar to FIG. 5 except that the internal process of the operation maximum load control process (S100) is different. In FIG. 11, the operation maximum load control process (S100) carries out a series of processes such as a reforming tube temperature measurement process (S202), a determination process (S204), a maximum temperature difference calculation process (S206), a determination process (S208), a determination process (S209), a determination process (S210), a pressure measurement process (S212), a pressure difference calculation process (S216), a determination process (S218), a determination process (S219), a determination process (S220), a maximum load determination process (S230), and a maximum load changing process (S232) as the internal process.

The contents of respective processes such as the hydrogen production amount acquisition process (S90), the operation schedule creation process (S92), and the hydrogen production apparatus operation process (S94) are as described above.

As the operation maximum load control process (S100), the operation maximum load control unit 60 (example of the operation control circuit) inputs a plurality of parameter values which become an index indicating the state of the catalysts 24, and controls the operation maximum load to any one among a plurality of stages of load in corresponding to a combination of states of the plurality of parameters.

As the reforming tube temperature measurement process (S202), as an example of parameter that becomes an index, each of the thermometers $20(a$ to $n)$ measures the temperature of a corresponding one of the reforming tubes 22. The measured temperature is received by the parameter reception unit 70 through the communication control unit 50, and is stored in the storage device 72 in association with measurement time (or reception time).

Next, as the determination process (S204), the temperature determination unit 61 reads out temperature data from the storage device 72, and determines whether or not the temperature Tk of the reforming tube $22k$ is within a range (Tt12<Tk<Tt22) of the low-temperature-side lower limit temperature Tt12 and the high-temperature-side upper limit temperature Tt22 for every reforming tube $22k$. In a case where a temperature of any one reforming tube 22 deviates from the range of the low-temperature-side lower limit temperature Tt12 and the high-temperature-side upper limit temperature Tt22 (NO in S204), the hydrogen production apparatus 100 is stopped as described above. A stopping method is as described above.

next, as the maximum temperature difference calculation process (S206), in a case where the temperature of all of the reforming tubes 22 is within the range of the low-temperature-side lower limit temperature Tt12 and the high-temperature-side upper limit temperature Tt22 (YES in S204), the temperature difference calculation unit 62 calculates a temperature difference (a maximum temperature difference ΔT) between the highest temperature and the lowest temperature among temperatures of the plurality of reforming tubes 22.

Next, as the determination process (S208), the determination unit 63 determines whether or not the calculated temperature difference ΔT is lower than the alarm threshold value Tth1. In a case where the calculated temperature difference ΔT is lower than the alarm threshold value Tth1 (YES in S208), there is no problem even though operation continues still at the current operation maximum load.

Accordingly, the process returns to the reforming tube temperature measurement process (S202), and the same processes are repeated. In addition, an identifier (for example, a1) indicating a state in which the temperature difference ΔT is lower than the alarm threshold value Tth1 is output to the operation maximum load determination unit 69. In a case where the calculated temperature difference ΔT is not lower than the alarm threshold value Tth1 (NO in S208), the process proceeds to the determination process (S209).

Next, as the determination process (S209), the determination unit 64 determines whether or not the calculated temperature difference ΔT is lower than the changing threshold value Tth2. In a case where the calculated temperature difference ΔT is lower than the changing threshold value Tth2 (YES in S209), the process proceeds to the maximum load determination process (S230), and an identifier (for example, a2) indicating a state in which the temperature difference ΔT is lower than the changing threshold value Tth2 is output to the operation maximum load determination unit 69. In a case where the temperature difference ΔT is not lower than the changing threshold value Tth2 (NO in S209), the process proceeds to the determination process (S210).

Next, as the determination process (S210), the determination unit 80 determines whether or not the current operation maximum load is a limit maximum load that is set in advance. The limit maximum load is set to, for example, 60%. In a case where the current operation maximum load is the limit maximum load that is set in advance (YES in S210), the hydrogen production apparatus 100 is stopped. In a case where the current operation maximum load is not the limit maximum load that is set in advance (NO in S210), the process proceeds to the maximum load determination process (S230), and an identifier (for example, a3) indicating that the temperature difference ΔT is not lower than the changing threshold value Tth2 is output to the operation maximum load determination unit 69.

Next, as the pressure measurement process (S212), as an example of parameter that becomes an index, the pressure gauges 10 and 12 measures the pressure P1 on an upstream side of the reformer 204 and the pressure P2 on a downstream side of the reformer 204. As described above, for example, in the example illustrated in FIG. 1, for example, the pressure gauge 10 measures the pressure P1 on the upstream side of the desulfurizer 202. The pressure gauge 12 measures the pressure P2 on the downstream side of the transformer 206. The measured pressures are received by the parameter reception unit 70 through the communication control unit 50, and are stored in the storage device 72 in association with measurement time (or reception time).

Next, as the pressure difference calculation process (S216), the pressure difference calculation unit 65 calculate a pressure difference ΔP (difference pressure) between the pressure on the upstream side of the reformer 204 and the pressure on the downstream side thereof by subtracting the pressure P2 on the downstream side of the reformer 204 from the pressure P1 on the upstream side of the reformer 204.

As the determination process (S218), the determination unit 66 determines whether or not the calculated pressure difference ΔP is lower than an alarm threshold value Pth1. In a case where the calculated pressure difference ΔP is lower than the alarm threshold value Pth1 (YES in S218), there is no problem even though operation continues still at the current operation maximum load. Accordingly, the process returns to the pressure measurement process (S212), and the same processes are repeated. In addition, an identifier (for example, b1) indicating a state in which the pressure difference ΔP is lower than the alarm threshold value Pth1 is output to the operation maximum load determination unit 69. In a case where the calculated pressure difference ΔP is not lower than the alarm threshold value Pth1 (NO in S218), the process proceeds to the determination process (S219).

As the determination process (S219), the determination unit 67 determines whether or not the calculated pressure difference ΔP is lower than the changing threshold value Pth2. In a case where the calculated pressure difference ΔP is lower than the changing threshold value Pth2 (YES in S219), the process proceeds to the maximum load determination process (S230), and an identifier (for example, b2) indicating a state in which the pressure difference ΔP is lower than the changing threshold value Pth2 is output to the operation maximum load determination unit 69. In a case where the pressure difference ΔP is not lower than the changing threshold value Pth2 (NO in S219), the process proceeds to the determination process (S220).

As the determination process (S220), the determination unit 80 determines whether or not the current operation maximum load is a limit maximum load that is set in advance. The limit maximum load is set to, for example, 60%. In a case where the current operation maximum load is the limit maximum load that is set in advance (YES in S220), the hydrogen production apparatus 100 is stopped. In a case where the current operation maximum load is not the limit maximum load that is set in advance (NO in S220), the process proceeds to the maximum load determination process (S230), and an identifier (for example, b3) indicating that the pressure difference ΔP is not lower than the changing threshold value Pth2 is output to the operation maximum load determination unit 69.

As described above, the operation maximum load determination unit 69 receives one among the identifiers a1 to a3 indicating states relating to the temperature difference Δ of the plurality of reforming tubes 22, and one among the identifiers b1 to b3 indicating states relating to the pressure difference ΔP representing a pressure loss of the reformer 204.

As the maximum load determination process (S230), the operation maximum load determination unit 69 determines that the operation maximum load is determined to any one among the plurality of stages of load in correspondence with a combination of the state relating to the temperature difference ΔT of the plurality of reforming tubes 22 and the state relating to the pressure difference ΔP representing the pressure loss of the reformer 204.

For example, in the case of a combination of a state (a1) in which the temperature difference ΔT is smaller than the alarm threshold value Tth1 and a state (b1) in which the pressure difference ΔP is smaller than the alarm threshold value Pth1, the operation maximum load determination unit 69 determines the operation maximum load to 100%.

For example, in the case of a combination of the state (a1) in which the temperature difference ΔT is smaller than the alarm threshold value Tth1 and a state (b2) in which the pressure difference ΔP is not smaller than the alarm threshold value Pth1 but is smaller than the changing threshold value Pth2, the operation maximum load determination unit 69 determines the operation maximum load to 95%.

For example, in the case of a combination of the state (a2) in which the temperature difference ΔT is not smaller than the alarm threshold value Tth1 but is smaller than the changing threshold value Tth2, and the state (b1) in which the pressure difference ΔP is smaller than the alarm threshold value Pth1, the operation maximum load determination unit 69 determines the operation maximum load to 90%. This example illustrates a case where the temperature difference ΔT is determined to have a higher priority as a factor for decreasing the operation maximum load in comparison to the pressure difference ΔP.

For example, in the case of a combination of the state (a2) in which the temperature difference ΔT is not smaller than the alarm threshold value Tth1 but is smaller than the changing threshold value Tth2, and the state (b2) in which the pressure difference ΔP is not smaller than the alarm threshold value Pth1 but is smaller than the changing threshold value Pth2, the operation maximum load determination unit 69 determines the operation maximum load to 80%.

For example, in the case of a combination of a state (a3) in which the temperature difference ΔT is not smaller than the changing threshold value Tth2, and the state (b2) in which the pressure difference ΔP is not smaller than the alarm threshold value Pth1 but is smaller than the changing threshold value Pth2, the operation maximum load determination unit 69 determines the operation maximum load to 70%.

For example, in the case of a combination of the state (a3) in which the temperature difference ΔT is not smaller than the changing threshold value Tth2, and a state (b3) in which the pressure difference ΔP is not smaller than the changing threshold value Pth2, the operation maximum load determination unit 69 determines the operation maximum load to 60%.

As the maximum load changing process (S232), the operation maximum load control processing unit 81 controls the operation maximum load to be deceased to a value determined among a plurality of stages of values in accordance with the combination of the states of the plurality of parameters. Specifically, control is performed to operate with an operation schedule at a determined operation maximum load. Accordingly, a value of the determined operation maximum load and a command of decreasing the operation maximum load are output to the schedule creation unit 54. In addition, the process returns to the operation schedule creation process (S92).

In addition, in the operation schedule creation process (S92), the schedule creation unit 54 receives the value of the determined operation maximum load and the command of decreasing the operation maximum load, and recreates the operation schedule at the determined operation maximum load.

Figure 12:
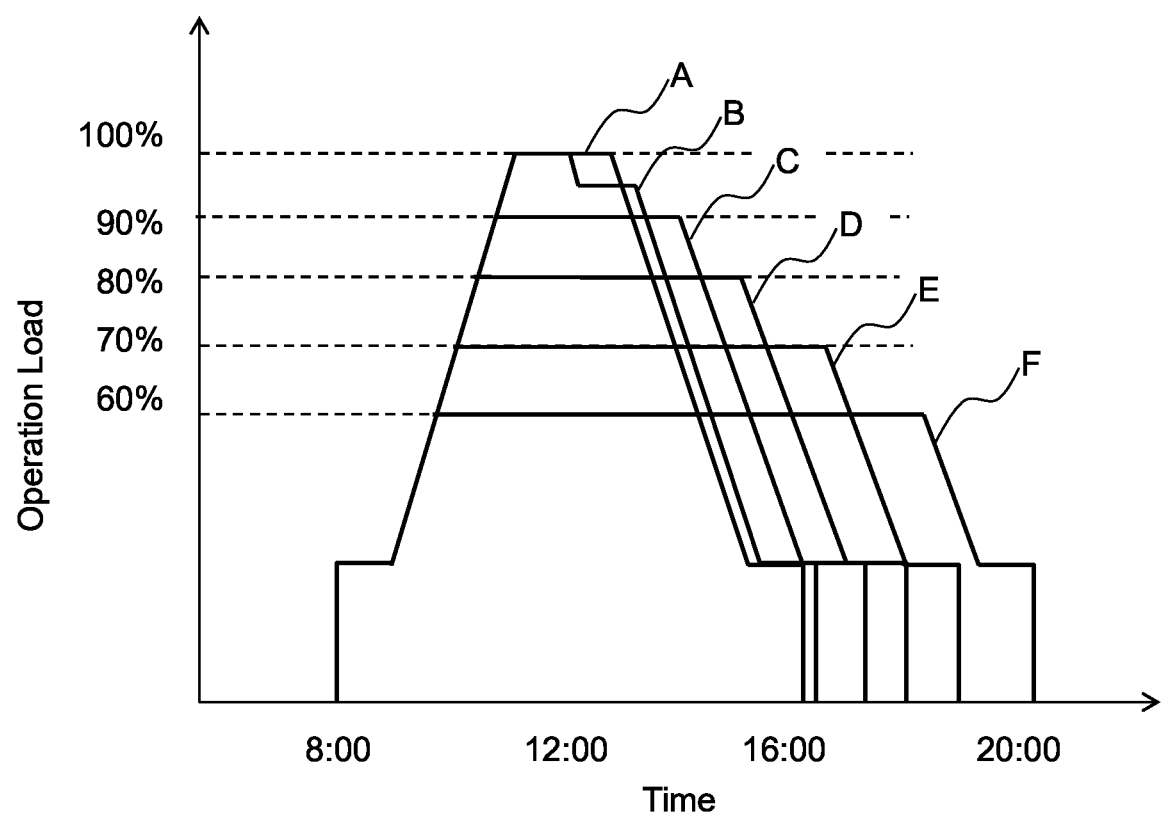
FIG. 12 is a view illustrating another example of the operation schedule of the hydrogen production apparatus in a modification example of Embodiment 1.

FIG. 12 is a view illustrating another example of the operation schedule of the hydrogen production apparatus in a modification example of Embodiment 1. In FIG. 12, the vertical axis represents the operation load of the hydrogen production apparatus 100. The horizontal axis represents time in the operation day. The example in FIG. 12 illustrates a case where the operation of the hydrogen production apparatus is initiated at 8:00. The operation load of the hydrogen production apparatus has an influence directly on the amount of the hydrogen gas that can be produced, and thus it is not preferable to decrease the operation load unnecessarily. According to this, the hydrogen production apparatus is required to operate at load as high as possible. Here, in the modification example of Embodiment 1, parameters of a pressure and a temperature are used as an index, and the operation maximum load is adjusted so as not to decrease the operation load unnecessarily while grasping the state of the catalysts 24 in accordance with a combination of the states of the parameters.

In the combination of the identifier a1 and b1, Operation Schedule (A) in which the operation maximum load is set to 100% is created as a state in which the deterioration of the catalysts 24 or the like does not occur. In Operation Schedule (A), for example, idling of the hydrogen production apparatus 100 is initiated at 8:00 at load of approximately 30%. In addition, the operation load is gradually increased from idling termination time (for example, 8:30) up to load of 100% at an acceleration set in advance. The example in FIG. 12 illustrates a case where operation is performed at operation load of 100%, for example, from 11:00 to 13:00. In addition, the operation load is decreased from 13:00 at a deceleration set in advance up to the idling load, and idling is initiated. In addition, the operation of the hydrogen production apparatus is terminated (stopped) at the idling termination time (for example, 16:00). In this case, a hydrogen gas in an amount corresponding to an area (an integrated value of a graph) surrounded by a graph of Operation Schedule (A) and the horizontal axis can be produced. The created schedule data is stored in the storage device 52.

In the combination of the identifiers a1 and b2, Operation Schedule (B) in which the operation maximum load is changed from 100% to 95% in the middle is created as a state in which the operation load is slightly decreased just in case although it cannot be said that deterioration of the catalysts 24 or the like occurs.

In the combination of identifiers a2 and b1, Operation Schedule (C) in which the operation maximum load is set to 90% is created as a state in which the operation load is further slightly decreased just in case although it cannot be said that deterioration of the catalysts 24 or the like occurs.

In the combination of the identifiers a2 and b2, Operation Schedule (D) in which the operation maximum load is set to 80% is created as an alarm state in which deterioration of the catalysts 24 or the like has occurred.

In the combination of the identifiers a3 and b2, Operation Schedule (E) in which the operation maximum load is set to 70% is created as a state in which the temperature difference further progresses from the alarm state in which deterioration of the catalysts 24 or the like has occurred.

In the combination of the identifiers a3 and b3, Operation Schedule (F) in which the operation maximum load is set to 60% is created as a state in which both the temperature difference and the pressure difference further progress from the alarm state in which deterioration of the catalysts 24 or the like has occurred.

Note that, the above-described example illustrates a case where creation of the operation schedule is performed in the hydrogen production apparatus 100, but there is no limitation to this case. The operation schedule of the hydrogen production apparatus 100 may be created at the outside of the hydrogen production apparatus 100. In this case, the reception unit 53 receives the created schedule data through the communication control unit 50, and the schedule data is stored in the storage device 52 and is updated. For example, the schedule data is overwritten.

In the hydrogen production apparatus operation process (S94), the operation control unit 56 operates by decreasing the operation maximum load in accordance with the updated operation schedule. In other words, the operation control unit 56 controls the hydrogen production mechanism 150 with the operation schedule in which the operation maximum load is decreased to operation maximum load determined among a plurality of stages of operation maximum load in correspondence with the combination of the states of the plurality of parameters.

In the modification example of Embodiment 1, in the above-described example, description has been given of the case of decreasing the operation maximum load during operation of the hydrogen production apparatus 100 on the day in a case where a cause (each combination) for changing the operation maximum load occurs, but there is no limitation to the case. For example, operation may be performed according to the original operation schedule on the day, and the operation maximum load may be decreased when creating an operation schedule for the next day.

In addition, in the modification example of Embodiment 1, in the above-described example, values of the parameters are measured at all time or at predetermined sampling time during operation of the hydrogen production apparatus 100, but there is no limitation thereto. The operation maximum load control unit 60 may perform control of changing the operation maximum load for every predetermined period. For example, control of measuring each parameter value and of changing the operation maximum load may be performed every day, every other day, every two days, . . . , every week, every few weeks, every month, or every few months.

As described above, according to the modification example of Embodiment 1, it is possible to find signs of performance deterioration of the catalysts 24, physical deterioration of the catalyst 24, or the like by a combination of states of a plurality of parameters and it is possible to timely adjust the operation load at a necessary step before the quality of the hydrogen gas deteriorates.

Figure 13:
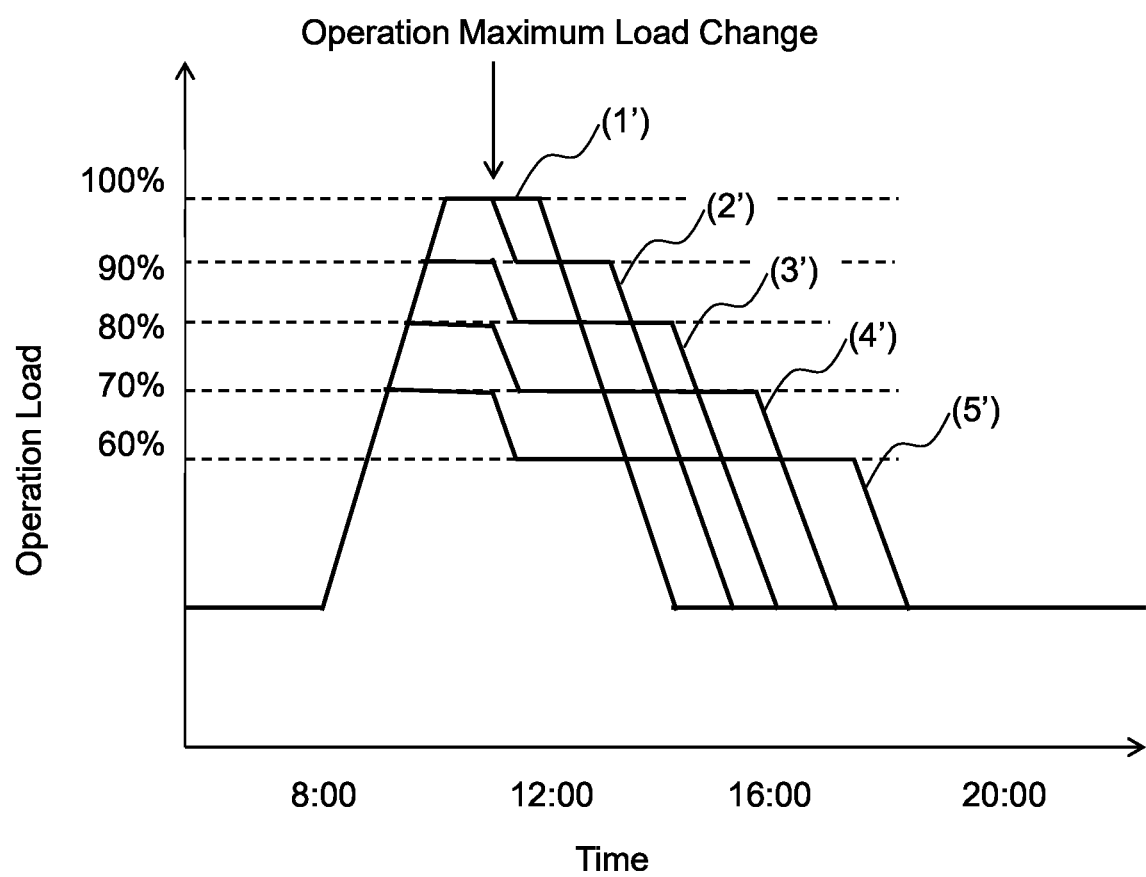
FIG. 13 is a view illustrating still another example of the operation schedule of the hydrogen production apparatus in Embodiment 1.

FIG. 13 is a view illustrating still another example of the operation schedule of the hydrogen production apparatus in Embodiment 1. In FIG. 13, the vertical axis represents the operation load of the hydrogen production apparatus 100. The horizontal axis represents time in the operation day. The example in FIG. 13 illustrates a case where idling is continued at night, and the operation load is gradually increased up to load of 100% at an acceleration set in advance, for example, from 8:00. Since idling from 8:00 to idling termination time (for example, 8:30) is not necessary, and thus acceleration initiation time and deceleration initiation time become earlier in comparison to FIG. 6. The other contents are similar as in FIG. 6. Here, an increase and a decrease of the operation load may be performed at an acceleration set in advance, or at a constant speed set in advance (for example, several %/minute).

In the example illustrated in FIG. 13, in a state in which deterioration of the catalysts 24 or the like does not occur, the schedule creation unit 54 creates Operation Schedule (1') on the assumption that the operation maximum load is 100%. In Operation Schedule (1'), idling is continued at night, and the operation load is gradually increased up to load of 100% at an acceleration set in advance, for example, from 8:00. The example in FIG. 13 illustrates a case where operation at load of 100% is performed, for example, from around 10:30 to around 12:30. In addition, the operation load is decreased up to idling load from around 12:30 at a deceleration set in advance, and idling is continued up to acceleration initiation time in the next day. In this case, it is possible to produce the hydrogen gas in an amount corresponding to an area (an integrated value of a graph) surrounded by the graph of Operation Schedule (1') and the horizontal axis. The hydrogen gas produced at night is accumulated in an accumulator or the like. Alternatively, the hydrogen gas may be discharged from a vent line (not illustrated). The created schedule data is stored in the storage device 52.

Note that, the above-described example illustrates a case where creation of the operation schedule is performed in the hydrogen production apparatus 100, but there is no limitation to this case. The operation schedule of the hydrogen production apparatus 100 may be created at the outside of the hydrogen production apparatus 100. In this case, the reception unit 53 may receive the created schedule data through the communication control unit 50, and may store the data in the storage device 52.

In addition, in the case of receiving a value of the determined operation maximum load and a command of decreasing the operation maximum load, in the operation schedule creation process (S92), the schedule creation unit 54 receives the value of the determined operation maximum load and the command of decreasing the operation maximum load, and recreates the operation schedule at the determined operation maximum load. As illustrated in FIG. 13, for example, in a case where changing (determination) of the operation maximum load exists during operation at 100% indicated by Graph (1'), a schedule before the time of changing is recreated to Graph (2') set to determined operation maximum load of 90%. Similarly, for example, in a case where changing (determination) of the operation maximum load exists during operation at 90% indicated by Graph (2'), a schedule before the time of changing is recreated to Graph (3') set to determined operation maximum load of 80%. Similarly, for example, in a case where changing (determination) of the operation maximum load exists during operation at 80% indicated by Graph (3'), a schedule before the time of changing is recreated to Graph (4') set to determined operation maximum load of 70%. Similarly, for example, in a case where changing (determination) of the operation maximum load exists during operation at 70% indicated by Graph (4'), a schedule before the time of changing is recreated to Graph (5') set to determined operation maximum load of 60%. Data of the recreated schedule is stored in the storage device 52 and is updated. For example, the data is overwritten. The other contents are similar as described above.

In addition, with regard to the other example of the operation schedule in the modification example of Embodiment 1 as illustrated in FIG. 12, similarly to FIG. 13, the hydrogen production apparatus 100 may start to operate in the morning of the day, and idling may be continued at night without being stopped at the time of completing production of the hydrogen gas for the day.

Hereinbefore, the embodiments have been described with reference to specific examples. However, the invention is not limited to the specific examples. In the example illustrated in FIG. 11, a determination process of determining whether or not temperatures of the reforming tubes 22 are individually within a range of the threshold temperatures Tt11 and Tt21 is omitted, but this process may be included. For example, when the temperature Tk of any one of the reforming tubes 22 deviates from a range of Tt11<Tk<Tt21, the identifier a2 may be included.

In addition, description of portions which are not directly necessary for description of the invention such as the device configuration, and the control method is omitted, but a necessary device configuration or a necessary control method may be appropriately selected and used.

In addition, all hydrogen gas production apparatuses and hydrogen gas production methods which include the elements of the invention and can be appropriately redesigned by those skilled in the art are included in the scope of the invention.

INDUSTRIAL APPLICABILITY

The invention relates to a hydrogen production apparatus and a hydrogen production method, and can be used, for example, in an apparatus and a method of producing a hydrogen gas that is used in a hydrogen station configured to fill a fuel cell vehicle using the hydrogen gas as a power source with the hydrogen gas.

REFERENCE SIGNS LIST 10, 12: PRESSURE GAUGE
20: THERMOMETER
22: REFORMING TUBE
50: COMMUNICATION CONTROL UNIT
51: MEMORY
52, 72: STORAGE DEVICE
53: RECEPTION UNIT
54: SCHEDULE CREATION UNIT
56: OPERATION CONTROL UNIT
58: RAW MATERIAL FLOW RATE CONTROL UNIT
60: OPERATION MAXIMUM LOAD CONTROL UNIT
61: TEMPERATURE DETERMINATION UNIT
62: TEMPERATURE DIFFERENCE CALCULATION UNIT
63: DETERMINATION UNIT
64: DETERMINATION UNIT
65: PRESSURE DIFFERENCE CALCULATION UNIT
66: DETERMINATION UNIT
67: DETERMINATION UNIT
68: ALARM OUTPUT UNIT
69: OPERATION MAXIMUM LOAD DETERMINATION UNIT
70: PARAMETER RECEPTION UNIT
73: TEMPERATURE DETERMINATION UNIT
80: DETERMINATION UNIT
81: OPERATION MAXIMUM LOAD CONTROL PROCESSING UNIT
100: HYDROGEN PRODUCTION APPARATUS
102: CONTROL CIRCUIT
104: COMPRESSOR
106: FLOW RATE ADJUSTMENT VALVE
108: FLOW METER
150: HYDROGEN PRODUCTION MECHANISM
200: STEAM REFORMER
202: DESULFURIZER
204: REFORMER
206: TRANSFORMER
208: GAS-LIQUID SEPARATOR
209: PSA DEVICE

The invention claimed is:

1. A hydrogen production apparatus comprising:
a hydrogen production mechanism configured to produce a hydrogen gas from a raw material by using a catalyst; and
an operation control circuit configured to control an operation maximum load of the hydrogen production mechanism to be variable in correspondence with a parameter value as an index indicating a state of the catalyst.

2. The hydrogen production apparatus according to claim 1,
wherein the parameter value is input to the operation control circuit.

3. The hydrogen production apparatus according to claim 1,
wherein the parameter value is received by the operation control circuit.

4. The hydrogen production apparatus according to claim 1, further comprising:
a reformer including a reforming tube including the catalyst disposed on an inner side; and
a thermometer configured to measure a temperature of the reforming tube,
wherein the parameter value comprises a temperature of the reforming tube, the temperature being measured by the thermometer.

5. The hydrogen production apparatus according to claim 4,
wherein the operation control circuit controls the operation maximum load to be decreased in a case where the temperature of the reforming tube is input as the parameter value, and the temperature of the reforming tube exceeds or falls below a threshold value set in advance.

6. The hydrogen production apparatus according to claim 1, further comprising:
a reformer including a plurality of reforming tubes including the catalyst disposed on an inner side; and
a plurality of thermometers each configured to measure a temperature of anyone of the plurality of reforming tubes,
wherein the parameter value comprises a temperature of each of the plurality of reforming tubes measured by a thermometer of the plurality of thermometers.

7. The hydrogen production apparatus according to claim 6,
wherein the operation control circuit controls the operation maximum load to be decreased in a case where the temperature of each of the plurality of reforming tubes is input as the parameter values and a maximum value of a temperature difference between the temperatures of the plurality of reforming tubes exceeds a threshold value set in advance.

8. The hydrogen production apparatus according to claim 1, further comprising:
a reformer including the catalyst disposed on an inner side;
a first pressure gauge configured to measure a pressure on an upstream side of the reformer; and
a second pressure gauge configured to measure a pressure on a downstream side of the reformer,
wherein parameter values comprise pressures measured by the first pressure gauge and the second pressure gauge.

9. The hydrogen production apparatus according to claim 8,
wherein the operation control circuit controls the operation maximum load to be decreased in a case where the pressures measured by the first pressure gauge and the second pressure gauge is input as the parameter values, and a pressure difference between a pressure measured by the first pressure gauge and a pressure measured by the second pressure gauge exceeds a threshold value set in advance.

10. A hydrogen production method comprising:
producing a hydrogen gas from a raw material by using a catalyst with a hydrogen production mechanism; and
controlling an operation maximum load of the hydrogen production mechanism to be variable in correspondence with a parameter value as an index indicating a state of the catalyst.

11. A hydrogen production apparatus comprising:
a hydrogen production mechanism configured to produce a hydrogen gas from a raw material by using a catalyst; and an operation control circuit configured to input a parameter value as an index indicating a state of the catalyst, and configured to control an operation maximum load of the hydrogen production mechanism to be variable in correspondence with the parameter value.

12. The hydrogen production apparatus according to claim 11,
wherein the hydrogen production mechanism produces the hydrogen gas by a steam reforming method by using a reformer including a reforming tube, the catalyst being mounted in the reforming tube, and
the operation control circuit controls the operation maximum load to be decreased in a case where a temperature of the reforming tube is input as the parameter, and the temperature of the reforming tube exceeds a threshold value set in advance.

13. The hydrogen production apparatus according to claim 11,
wherein the hydrogen production mechanism produces the hydrogen gas by a steam reforming method by using a reformer including a plurality of reforming tubes, the catalyst being mounted in each of the plurality of reforming tubes, and
the operation control circuit controls the operation maximum load to be decreased in a case where temperatures of plurality of reforming tubes are input as the parameter, and a temperature difference between the plurality of reforming tubes exceeds a threshold value set in advance.

14. The hydrogen production apparatus according to claim 11,
wherein the operation control circuit controls the operation maximum load to be decreased in a case where a pressure on an upstream side of the reformer and a pressure on a downstream side of the reformer are input as the parameter, and a difference pressure between the pressure on the upstream side and the pressure on the downstream side exceeds a threshold value set in advance.

15. The hydrogen production apparatus according to claim 11,
wherein the operation control circuit inputs a plurality of parameter values as an index indicating a state of the catalyst, and controls the operation maximum load to any one of a plurality of stages of load in correspondence with a combination of states of the plurality of parameters.

16. The hydrogen production apparatus according to claim 11,
wherein the operation control circuit performs control of changing the operation maximum load for each predetermined period.

17. A hydrogen production method comprising:
manufacturing a hydrogen gas from a raw material by using a catalyst in a hydrogen production apparatus; and
inputting a parameter value as an index indicating a state of the catalyst and controlling an operation maximum load of the hydrogen production apparatus to be variable in accordance with the parameter value.

* * * * *